(12) United States Patent
Nakajima et al.

(10) Patent No.: US 8,786,679 B2
(45) Date of Patent: Jul. 22, 2014

(54) IMAGING DEVICE, 3D MODELING DATA CREATION METHOD, AND COMPUTER-READABLE RECORDING MEDIUM STORING PROGRAMS

(75) Inventors: Mitsuyasu Nakajima, Tokyo (JP); Yuki Yoshihama, Inagi (JP)

(73) Assignee: Casio Computer Co., Ltd., Tokyo (JP)

( * ) Notice: Subject to any disclaimer, the term of this patent is extended or adjusted under 35 U.S.C. 154(b) by 343 days.

(21) Appl. No.: 12/963,763

(22) Filed: Dec. 9, 2010

(65) Prior Publication Data

US 2011/0157321 A1 Jun. 30, 2011

(30) Foreign Application Priority Data

Dec. 25, 2009 (JP) ................................. 2009-294804

(51) Int. Cl.
- *H04N 15/00* (2006.01)
- *H04N 13/02* (2006.01)
- *H04N 17/00* (2006.01)
- *H04N 17/02* (2006.01)

(52) U.S. Cl.
CPC ................................. *H04N 13/0239* (2013.01)
USPC ................................. 348/47; 348/50; 348/175

(58) Field of Classification Search
None
See application file for complete search history.

(56) References Cited

U.S. PATENT DOCUMENTS

2007/0076090 A1* 4/2007 Alexander ...................... 348/47

FOREIGN PATENT DOCUMENTS

| JP | 11-201741 A | 7/1999 |
| JP | 2001-082938 A | 3/2001 |
| JP | 2002-058046 A | 2/2002 |

OTHER PUBLICATIONS

Japanese Office Action dated Oct. 25, 2011 (and English translation thereof) in counterpart Japanese Application No. 2009-294804.

* cited by examiner

*Primary Examiner* — Joseph Ustaris
*Assistant Examiner* — Kevin McInnish
(74) *Attorney, Agent, or Firm* — Holtz Holtz Goodman & Chick PC

(57) ABSTRACT

A control part 210 sets up an exposure condition under which the bright part of the object is properly exposed and an exposure condition under which the dark part of the object is properly exposed. The control part 210 controls the first and second imaging part 110 and 120 to capture images with the set exposures, whereby a pair of images captured with different exposures is obtained. The control part 210 extracts corresponding points that are characteristic points corresponding between the image pairs. The control part 210 optimizes the extracted corresponding points based on the density of corresponding points between the images constituting an image pair captured with the same exposure and based on the pixel value of the corresponding points between the images captured with different exposures. The control part 210 creates 3D modeling data using the optimized corresponding points.

9 Claims, 15 Drawing Sheets

IMAGE CAPTURED BY LEFT CAMERA
(SECOND IMAGING PART 120)
= IMAGE IM $^{(L)}$

IMAGE CAPTURED BY RIGHT CAMERA
(FIRST IMAGING PART 110)
= IMAGE IM $^{(R)}$

IMAGING DEVICE, 3D MODELING DATA CREATION METHOD, AND COMPUTER-READABLE RECORDING MEDIUM STORING PROGRAMS

CROSS-REFERENCE TO RELATED APPLICATION

This application claims the benefit of Japanese Patent Application No. 2009-294804 filed Dec. 25, 2009, the entire disclosure of which is incorporated by reference herein.

FIELD

The present invention relates generally to an imaging device, a 3D modeling data creation method, and a computer-readable recording medium storing programs, and more particularly to an imaging device, a 3D modeling data creation method, and a computer-readable recording medium storing programs suitable for creating 3D modeling data from an object having contrast in brightness.

BACKGROUND

Three-dimensional (3D) display by computer graphics has become extensively used and 3D display that looks more real is demanded. In response to such a demand, methods of capturing images of actual three-dimensional objects and creating 3D modeling data have been established.

In such cases, what is called a compound eye camera (stereo camera) having optical axes shifted in accordance with the parallax is used in order to identify the three-dimensional position of an object.

Also known are pattern projection methods in which a projection pattern such as a dot pattern is projected on a three-dimensional imaging-target object so that characteristic points can be obtained even if the object has no texture and is difficult to identify its three-dimensional shape including recesses and projections.

SUMMARY

In capturing an image of an object on which a projection pattern is projected for creating 3D modeling data, it is difficult to properly expose the entire object when the object has contrast in brightness. Therefore, the projected projection pattern may not precisely be identified in the captured image. In such a case, it is not easy to obtain highly accurate 3D modeling data.

An exemplary object of the present invention is to provide an imaging device that can easily create highly accurate 3D modeling data even if the object has contrast in brightness, a 3D modeling data creation method, and a computer-readable recording medium storing programs.

In order to achieve the above object, the imaging device according to a first exemplary aspect of the present invention comprises:
  an imaging part acquiring two captured images of one and the same object that are captured at different positions;
  an exposure setting part setting up one or multiple exposure conditions for the imaging part to capture images of the object;
  an imaging control part controlling the imaging part and performing imaging operation as many times as the number of exposure conditions set up by the exposure setting part;
  a corresponding point extraction part extracting corresponding points that are characteristic points corresponding between the two captured images based on the captured images obtained under the control of the imaging control part;
  a corresponding point optimization part selecting the corresponding points falling under given conditions from the corresponding points extracted by the corresponding point extraction part; and a 3D modeling data creation part creating 3D modeling data using the corresponding points selected by the corresponding point optimization part.

In order to achieve the above object, the 3D modeling data creation method according to a second exemplary aspect of the present invention is a 3D modeling data creation method for creating 3D modeling data of one and the same object with an imaging device comprising an imaging part for obtaining a pair of images of the object that are captured at different positions, including:
  a first imaging step of obtaining a first pair of images in an imaging operation of the imaging part in which the bright part of the object is properly exposed;
  a second imaging step of obtaining a second pair of images in an imaging operation of the imaging part in which the dark part of the object is properly exposed;
  a corresponding point extraction step of extracting corresponding points that are corresponding characteristic points in each of the first and second pairs of images;
  a first corresponding point optimization step of selecting the corresponding points extracted in the corresponding point extraction step and of which the density meets a given condition in each of the first and second pairs of images;
  a second corresponding point optimization step of selecting the corresponding points extracted in the corresponding point extraction step and of which the pixel value meets a given condition between the first and second pairs of images; and
  a 3D modeling data creation step of combining the corresponding points selected in the first corresponding point optimization step and second corresponding point optimization step and creating 3D modeling data using the combined corresponding points.

In order to achieve the above object, the programs stored in a computer-readable recording medium according to a third exemplary aspect of the present invention allows a computer of an imaging device comprising an imaging part acquiring two images of one and the same object that are captured at different positions to realizes the following functions:
  setting up one or multiple exposure conditions for the imaging part to capture images of the object;
  controlling the imaging part and performing imaging operation as many times as the number of exposure conditions set up by the exposure setting part;
  extracting corresponding points that are characteristic points corresponding between the two captured images based on the captured images obtained in the imaging operation;
  selecting the corresponding points falling under given conditions from the extracted corresponding points; and
  creating 3D modeling data using the selected corresponding points.

BRIEF DESCRIPTION OF THE DRAWINGS

A more complete understanding of this application can be obtained when the following detailed description is considered in conjunction with the following drawings, in which:

FIG. 7 is an illustration showing "photometric point specifying screens" displayed in the "multilevel exposure determination process" shown in FIG. 6.

FIG. 12 is an illustration for explaining the "corresponding point optimization process (1)" shown in FIG. 11.

DETAILED DESCRIPTION

Figure 1A:
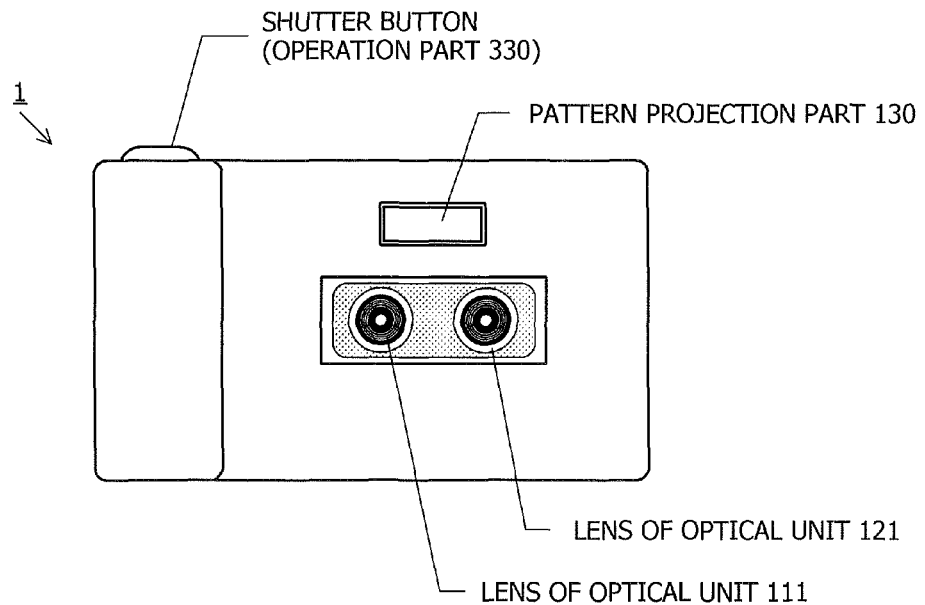
FIG. 1A is an illustration showing the appearance of a digital camera for explaining that the digital camera according to an embodiment of the present invention is a compound eye camera (parallel stereo camera)

An embodiment of the present invention will be described hereafter with reference to the drawings. In this embodiment, the present invention is realized by a digital still camera ("digital camera" hereafter). A digital camera 1 of this embodiment is supposed to have functions of an ordinary digital still camera and, as shown in FIG. 1A, is what is called a compound eye camera (stereo camera) having two imaging structures.

The digital camera 1 having the above compound eye camera structure has, in addition to regular imaging functions, a function of three-dimensional modeling (3D modeling) using captured images. Therefore, a pattern projection part 130 (which will be described in detail later) is provided as shown in FIG. 1A for obtaining captured images suitable for 3D modeling.

Figure 2:
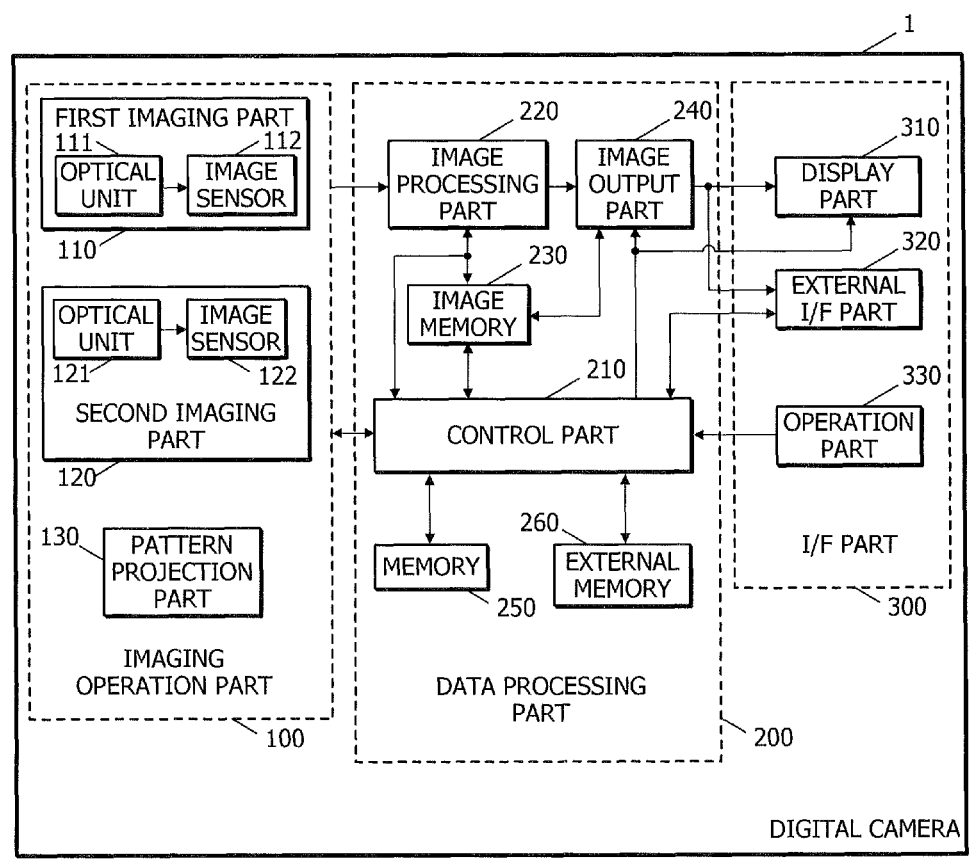
FIG. 2 is a block diagram showing the structure of a digital camera according to an embodiment of the present invention.

The structure of the digital camera 1 will be described with reference to FIG. 2. FIG. 2 is a block diagram showing the structure of the digital camera 1 according to an embodiment of the present invention. The digital camera 1 of this embodiment is generally composed of, as shown in the figure, an imaging operation part 100, a data processing part 200, an interface (I/F) part 300, and so on.

The imaging operation part 100 performs operations regarding imaging of the digital camera 1 and is composed of, as shown in FIG. 2, a first imaging part 110, a second imaging part 120, a pattern projecting part 130, and so on.

The first and second imaging parts 110 and 120 perform imaging operation of the digital camera 1. As described above, the digital camera 1 of this embodiment is a compound eye camera and, therefore, has the first and second imaging parts 110 and 120. The first and second imaging parts 110 and 120 have the same structure. In the following explanation, the components of the first imaging part 110 will be referred to by reference numbers of 110s and the components of the second imaging part 120 will be referred to by reference numbers of 120s.

As shown in FIG. 2, the first imaging part 110 (second imaging part 120) is composed of an optical unit 111 (121), an image sensor 112 (122), and so on.

The optical unit 111 (121) contains, for example, a lens, an aperture mechanism, a shutter mechanism, and so on and performs optical operation regarding imaging. In other words, the optical unit 111 (121) operates to collect the incident light and adjust optical elements regarding the field angle, focus, and exposure, such as the focal length, aperture, and shutter speed.

Here, the shutter mechanism contained in the optical unit 111 (121) is what is called a mechanical shutter. The optical unit 111 (121) does not need to contain a shutter mechanism where the shutter operation is conducted only by the image sensor operation. Additionally, the optical unit 111 (121) operates under the control of a control part 210, which will be described later.

The image sensor 112 (122) generates electric signals according to the incident light collected by the optical unit 111 (121). It is composed of, for example, an image sensor such as a CCD (charge coupled device) and CMOS (complementally metal oxide semiconductor). The image sensor 112 (122) performs photoelectric conversion to generate electric signals corresponding to the received light and outputs them to the data processing part 200.

As described above, the first and second imaging part 110 and 120 have the same structure. More specifically, they have the same specification for all of the focal length f and F value of the lens, the aperture range of the aperture mechanism, the size and number, arrangement, and area of pixels of the image sensor, and so on.

The digital camera 1 having the above first and second imaging parts 110 and 120 has a lens of the optical unit 111 and a lens of the optical unit 121 on the same plane of the exterior of the digital camera 1.

Here, the two lenses (light reception parts) are provided in the manner that their centers are on one and the same horizontal line when the digital camera 1 is held horizontally with the shutter button facing upward. In other words, when the first and second imaging parts 110 and 120 operate at the same time, they capture images of the same object; these images have optical axes horizontally shifted from each other.

Figure 1B:
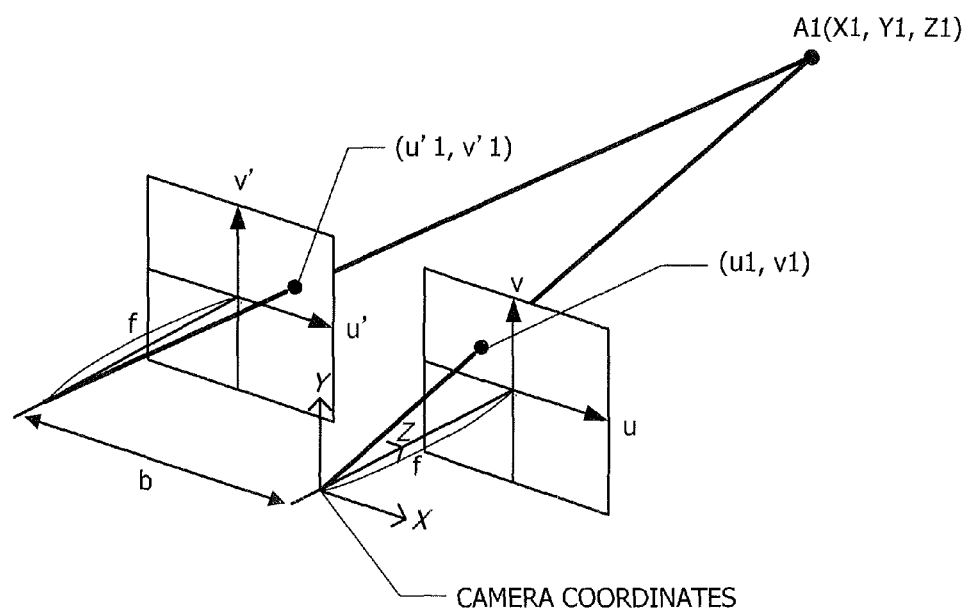
FIG. 1B is a illustration showing the concept of parallel stereo for explaining that the digital camera according to an embodiment of the present invention is a compound eye camera (parallel stereo camera)

In this case, the first and second imaging parts 110 and 120 are so provided as to yield the optical characteristics as shown in the perspective projection model in FIG. 1B. The perspective projection model in FIG. 1B is based on a three-dimensional, X, Y, and Z, orthogonal coordinate system. The coordinate system of the first imaging part 110 will be termed "the camera coordinates" hereafter. FIG. 1B shows the camera coordinates with the point of origin coinciding with the optical center of the first imaging part 110.

In the camera coordinates, the Z axis extends in the optical direction of the camera and the X and Y axes extend in the horizontal and vertical directions of an image, respectively. The intersection between the optical axis and the coordinate plane of an image is the point of origin (namely, the optical center). With the pixel pitch of the image sensor being converted to conform to the camera coordinates in unit of length, an object A1 is located at image coordinates (u1, v1) on the image coordinate plane of the first imaging part 110 and at image coordinates (u'1, v'1) on the image coordinate plane of the second imaging part 120.

The first and second imaging parts 110 and 120 are provided in the manner that their optical axes are parallel (namely, the angle of convergence is 0) and the image coordinate axis u of the first imaging part 110 and the image coordinate axis u' of the second imaging part 120 are on the same line and in the same direction (namely, the epipolar lines coincide with each other). Furthermore, as described above, the first and second imaging parts 110 and 120 have the same foal length f and pixel pitch and their optical axes are orthogonal to their image coordinate planes. Such a structure is termed "parallel stereo." The first and second imaging parts 110 and 120 of the digital camera 1 constitute a parallel stereo structure.

Returning to FIG. 2, the structure of the digital camera 1 will further be described.

The pattern projection part 130 projects a projection pattern for the digital camera 1 to capture images for 3D modeling by the use of a pattern projection method. The pattern projection part 130 is composed of, for example, a light source consisting of a light emitting device such as a xenon flash and LED, a projection pattern to be projected on an object by light from the light source, a lens and reflecting plate for converging or diverging the projection light, and so on.

The pattern projection part 130 can be realized by a dedicated device having the above structure or, for example, by adding a structure for projecting a projection pattern to the structure having a light emission capability that an ordinary digital camera has, such as a built-in strobe and AF auxiliary light.

The data processing part 200 processes electric signals generated through imaging operation by the first and second imaging parts 110 and 120, creates digital data presenting captured images, and performs image processing on the captured images. As shown in FIG. 2, the data processing part 200 is composed of a control part 210, an image processing part 220, an image memory 230, an image output part 240, a memory 250, an external memory 260, and so on.

The control part 210 is composed of, for example, a processor such as a CPU (central processing unit), a main storage (memory) such as a RAM (random access memory), and so on and executes programs stored in the memory 250, which will be described later, to control the parts of the digital camera 1. In this embodiment, the control part 210 executes given programs to realize the functions regarding the procedures described later. In this embossment, the control part 210 also executes the procedures regarding 3D modeling. However, such procedures can be executed by a dedicated processor or the like independent from the control part 210.

The image processing part 220 is composed of, for example, an ADC (analog-digital converter), a buffer memory, a processor for image processing (what is called a image processing engine), and so on. The image processing part 220 creates digital data presenting captured images based on electric signals generated by the image sensors 112 and 122.

More specifically, the ADC converts analog electric signals from the image sensor 112 (122) to digital signals and stores them in the buffer memory in sequence. The image processing engine of the image processing part 220 performs what is called development on the buffered digital data to adjust the image quality and compress the data.

The image memory 230 is composed of, for example, a memory such as a RAM and flash memory. The image memory 230 temporarily stores captured image data created by the image processing part 220, image data to be processed by the control part 210, and so on.

The image output part 240 is composed of, for example, a RGB signal generation circuit. The image out part 240 converts image data stored in the image memory 230 to RGB signals and outputs them on the display screen (the display part 310 that will be described later).

The memory 250 is composed of, for example, a memory such as a ROM (read only memory) and flash memory. The memory 250 stores programs and data necessary for operations of the digital camera 1. In this embodiment, the memory 250 stores parameters and calculation formulae necessary for operation programs and procedures to be executed by the control part 210.

The external memory 260 is composed of, for example, a memory detachably mounted on the digital camera 1 such as a memory card. The external memory 260 stores image data captured by the digital camera 1 and generated 3D modeling data.

The interface part 300 is in charge of interface between the digital camera 1 and its user or an external device. As shown in FIG. 2, the interface part 300 is composed of a display part 310, an external interface (I/F) part 320, an operation part 330, and so on.

The display part 310 is composed of, for example, a liquid crystal display. The display part 310 displays various screens necessary for operating the digital camera 1, a live view image at the time of capturing an image, captured images, 3D modeling data, and so on. In this embodiment, the display part 310 displays captured images and the like based on image signals (RGB signals) from the image output part 240.

The external interface part 320 is composed of, for example, a USB (universal serial bus) connector, video output terminals, and so on. The external interface part 320 is used to transfer image data or 3D modeling data to an external computer device or display captured images or 3D modeling images on an external monitor.

The operation part 330 is composed of various buttons provided on the outer surface of the digital camera 1. The operation part 330 generates input signals according to operation by the user of the digital camera 1 and supplies them to the control part 210. The buttons of the operation part 330 include a shutter button designated to shutter operation, a mode button for specifying one of the operation modes of the digital came 1, and an arrow key and function buttons for configuring various settings including setting of 3D modeling.

Here, in this embodiment, the control part 210 executes operation programs stored in the memory 250 to realize the procedures described later. Functions realized by the control part 210 in this case will be described with reference to FIG. 3.

Figure 3:
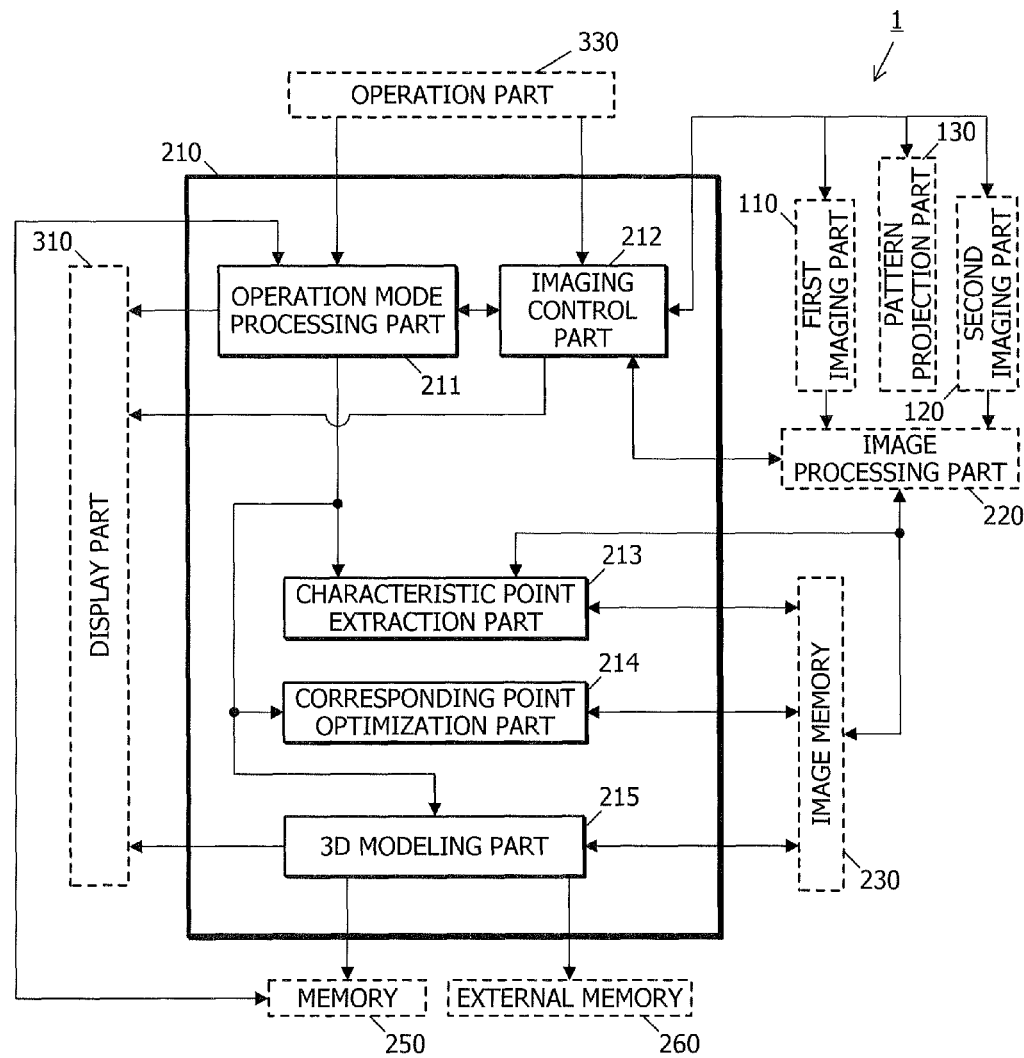
FIG. 3 is a functional block diagram showing the functions realized by the control part shown in FIG. 2.

FIG. 3 is a functional block diagram showing the functions realized by the control part 210. Here shown are the functional components necessary for extracting an object image from an image captured by a compound eye camera. In this case, as shown in FIG. 3, the control part 210 functions as an operation mode processing part 211, an imaging control part 212, a corresponding point extraction part 213, a corresponding point optimization part 214, a 3D modeling part 215, and so on.

The operation mode processing part 211 collaborates with the display part 310 to display a screen necessary for the user of the digital camera 1 specifying various operation modes of the digital camera 1 or a setting screen for each operation mode specified. Additionally, the operation mode processing part 211 collaborates with the operation part 330 to identify the operation mode specified by the user, reads programs, calculation formulae, etc. necessary for executing the operation mode, and loads them to the main storage (memory) of the control part 210.

In this embodiment, the user specifies the operation mode for 3D modeling from captured images (3D modeling mode) after capturing images with the digital camera 1. The functional components of the control part 210 that will be described hereafter are realized by executing programs loaded by the operation mode processing part 211 in response to the 3D modeling mode being specified.

The imaging control part 212 controls the first and second imaging parts 110 and 120 for the digital camera 1 to perform imaging operation. In this case, the imaging control part 212 performs various imaging processes and controls executed in an ordinary digital camera, such as photometry, focusing, automatic exposure, and screen display at the time of capturing an image.

The 3D modeling function of this embodiment utilizes multiple images captured by the first and second imaging parts 110 and 120 constituting a parallel stereo structure. Therefore, the imaging control part 212 of this embodiment controls the first and second imaging parts 110 and 120 to capture images simultaneously and serially. Furthermore, the imaging control part 212 controls them to capture images serially with different exposures. Then, multiple sets of captured images with different exposures, each set (pair) consisting of two images captured at different positions, are obtained for one and the same object.

Furthermore, in this embodiment, the imaging control part 212 controls the pattern projection part 130 to project a projection pattern on the object during imaging operation in the "3D modeling mode."

The corresponding point extraction part 213 performs matching check between captured images and extracts characteristic points given by image patterns that are the images of the projection pattern projected on the object by the pattern projection part 130 and appearing on the captured images. In this case, the corresponding point extraction part 213 extracts characteristic points (corresponding points) corresponding between multiple images captured at different positions, which are obtained by a compound eye camera.

In this embodiment, the matching between images for extracting corresponding points is a template matching in which one image is used as the template (template matching). In this case, for example, a template matching using the SSD (sum squared difference) in which the evaluation formula consists of the sum of squared differences is employed. In the SSD template matching, a value "0" is given when two images completely match. In other words, a higher value is given when two images are different to a higher degree. The value given by the template matching indicates the degree of difference from the template. For example, the brightness or green value of images is employed in such a template matching.

The corresponding point optimization part 214 optimizes the corresponding points extracted by the corresponding point extraction part 213 for suitable use in 3D modeling. In this case, the corresponding point optimization part 214 calculates the distance between a corresponding point extracted by the corresponding point extraction part 213 and surrounding corresponding points or a corresponding point in a different frame (captured at a different time) and eliminates the corresponding point based on conditions regarding the distance. Here, the distance is a distance in the Euclidean space.

Furthermore, in addition to the optimization based on the distance between corresponding points, the corresponding point optimization part 214 compares the brightness at a position corresponding between images captured under different exposure conditions and eliminates corresponding points based on conditions regarding the brightness when images are captured under different exposure conditions.

The 3D modeling part 215 performs 3D modeling using the corresponding points (characteristic points) optimized by the corresponding point optimization part 214. In this case, for example, the 3D modeling part 215 performs Delaunay division on the corresponding points to create a polygon for 3D modeling.

The control part 210 realizes the above-described functions. In this embodiment, the control part 210 executes programs to logically realize the above functions. These functions can be realized by hardware such as ASICs (application specific integrated circuits). In such a case, the functions regarding image processing among the functions shown in FIG. 3 can be realized by the image processing part 220.

The above-described components of the digital camera 1 are essential components for realizing the present invention. Other components used for basic functions of a digital camera or for various additional functions are provided as necessary.

Operation of the digital camera 1 having the above structure will be described hereafter. Here, operation in the above-mentioned "3D modeling mode" among the operation modes of the digital camera 1 will be described. In such a case, images are captured by the digital camera 1 and the captured images are used for 3D modeling.

Figure 4A:
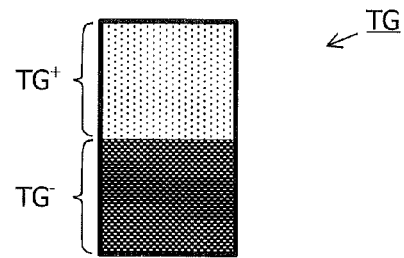
FIG. 4A is an illustration showing an imaging-target object for explaining the imaging operation of the digital camera shown in FIG. 1A.
Figure 4A:
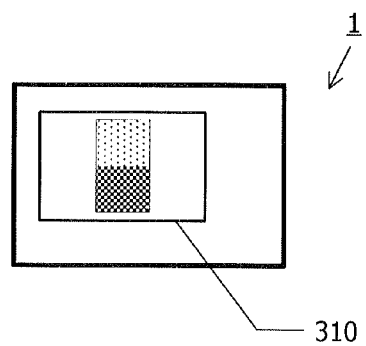

In this embodiment, it is assumed that images of an object TG as shown in FIG. 4A are captured. The object TG includes, as shown in FIG. 4A, a whitish part (bright part) having a high reflectance and a blackish part (dark part) having a low reflectance. In the following explanation, the bright part of the object TG is referred to as an object $TG^+$ and the dark part is referred to as an object $TG^-$. In the figure, the object TG is shown as a simplified figure. An actually imaged object TG is a three-dimensional object (for example, person, animal, art object, etc). In this embodiment, images of the object TG, a three-dimensional object, are captured by the digital camera 1 and the captured images are used to create 3D modeling data for presenting the object TG as a three-dimensional image.

Figure 4B:
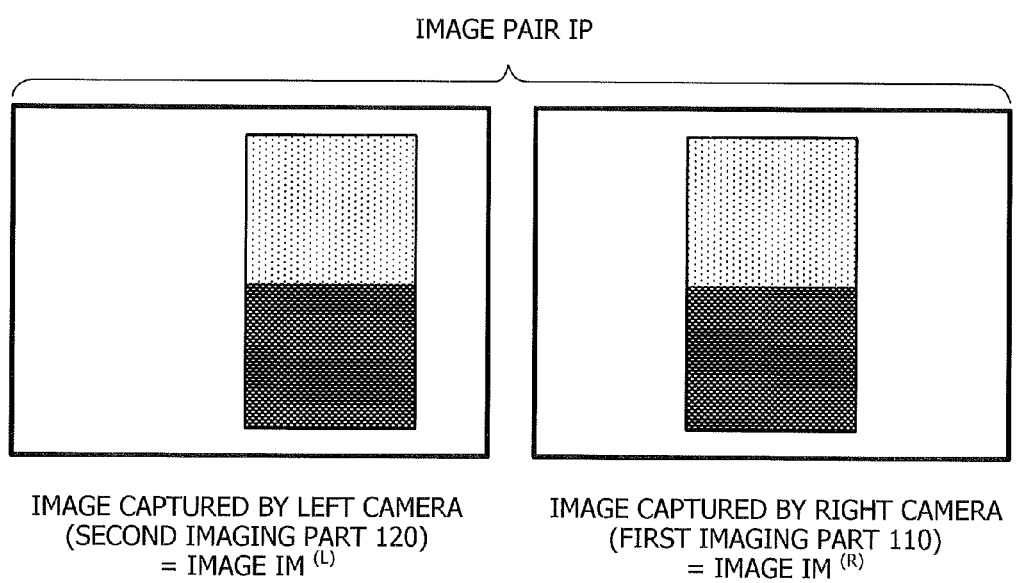
FIG. 4B is an illustration showing a pair of captured images for explaining the imaging operation of the digital camera shown in FIG. 1A.

As described above, the digital camera 1 of this embodiment has a compound eye camera structure. FIG. 4B shows images of the object TG captured by the digital camera 1. In this embodiment, the lens constituting the first imaging part 110 is provided on the right when facing the object. The image captured by the first imaging part 110 (right camera) at such a position is termed a reference image. In other words, the image captured by the first imaging part 110 is used as a finder image. For example, when a frame is so determined as to have an object in the center of the screen, this is reflected in an image $IM^{(R)}$, an image captured by the first imaging part 110 as shown in FIG. 4B.

On the other hand, the second imaging part 120 is provided to the left of the first imaging part 110. Therefore, an image $IM^{(L)}$, an image captured by the second imaging part 120 (left camera), has the object shifted to the right compared with in the image $IM^{(R)}$ as shown in FIG. 4B.

In this embodiment, the first and second imaging parts 110 and 120 capture images simultaneously. Therefore, the images $IM^{(L)}$ and $IM^{(R)}$ as shown in FIG. 4B are captured simultaneously. A pair of images $IM^{(L)}$ and $IM^{(R)}$ captured in one imaging operation is termed an image pair IP.

The "3D modeling imaging process" executed when the "3D modeling mode" is selected on the digital camera 1 capturing the above captured images will be described with reference to the flowchart shown in FIG. 5. The "3D modeling imaging process" starts when the user of the digital camera 1 operates the operation part 330 and selects the 3D modeling mode. In this case, the operation mode processing part 211 loads programs regarding the object extraction operation from the memory 250, whereby the functional components shown in FIG. 3 execute the following procedures.

After the process starts, the imaging control part 212 determines whether the shutter button is operated based on input signals from the operation part 330 (Step S11). In the digital camera 1 of this embodiment, the shutter button works with two-stage stroke as in an ordinary camera. The state in which the shutter button is pressed to the first-stage of the stroke (halfway to the full stroke) is termed "half-shuttered" and the state in which the shutter button is pressed to the second-stage of the stroke (all the way to the full stroke) is termed "full-shuttered."

In step S11, the imaging control part 212 determines whether the shutter button is half-shuttered or full-shuttered. Here, the shutter button is half-shuttered for focusing on an object as in an ordinary camera. When it is found to be half-shuttered in Step S11, the framing of the object TG is established as shown in FIG. 4A and the focus is on the object TG.

In this embodiment, since captured images are used for 3D modeling, the framing is so established as to have the object TG in the center of the finder and include the entire TG. Furthermore, multiple serial imaging operations are conducted to obtain images. It is desirable that the digital camera 1 is secured during imaging operation so that the position of the object TG in images does not change.

After the shutter button is half-shuttered (Step S11: Yes), the imaging control part 212 controls the imaging part 110 for focusing. Here, the imaging control part 212 determines the exposure by automatic exposure (AE) (Step S12). Here, the imaging control part 212 determines the exposure by multiple division photometry that is a standard photometric method in AE. More specifically, the imaging control part 212 divides the entire screen into multiple divisions, measures light, and calculates an exposure condition under which the overall brightness is equal to a gray level of a reflectance of 18%. The exposure condition (a combination of aperture, shutter speed, ISO sensitiveness, and so on) determined by the multiple division photometry in Step S12 is termed "EV0" (EV: exposure value). The imaging control part 212 stores the determined EV0 in the memory.

After calculating the exposure condition, the imaging control part 212 creates a histogram indicating the brightness distribution of a captured image (here, a motion picture as a finder image) under the exposure condition. The imaging control part 212 examines the histogram (Step S13) and determines whether the object TG has significant contrast in brightness (Step S14). Here, the imaging control part 212 determines that the object TG has contrast in brightness when the histogram has a large peak both on the darker side and on the brighter side. The imaging control part 212 determines that the object TG has significant contrast in brightness when an image of an object TG including an object $TG^+$ and an object $TG^-$ as shown in FIG. 4A is captured.

Here, in this embodiment, the imaging control part 212 controls the pattern projection part 130 to project a projection pattern on the object TG for obtaining 3D modeling data from captured images (which will be described in detail later). In such a case, if the object has significant contrast in brightness, the image pattern may not be identified in part under the exposure condition determined by the multiple division photometry in which the brightness is assumed to be overall equal. Then, accurate 3D modeling is not achieved.

For this reason, in this embodiment, the imaging control part 212 determines the exposure condition separately for the bright part (namely, the object $TG^+$) and for the dark part (namely, the object $TG^-$) of the object TG ("multilevel exposure", hereafter) when it is determined that the object TG has significant contrast in brightness in Step S14. Then, the imaging control part 212 captures images under each exposure condition so that the image pattern can be extracted from captured images with accuracy.

Then, when the imaging control part 212 determines that the object TG has significant contrast in brightness (Step S14: Yes), the imaging control part 212 executes a "multilevel exposure determination process" for determining exposure conditions for the multilevel exposure. The "multilevel exposure determination process" will be described with reference to the flowchart shown in FIG. 6.

Figure 7A:
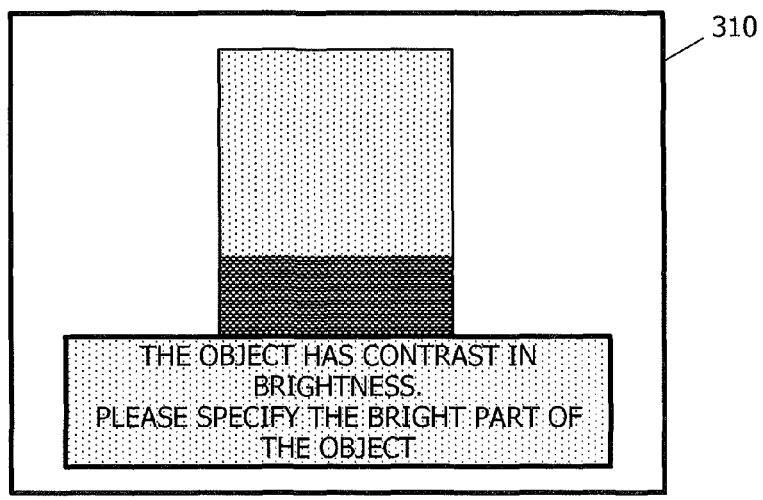
FIG. 7A shows an exemplary displayed message and FIG. 7B shows exemplary photometric points.

After the process starts, the imaging control part 212 displays on the display part 310 a "photometric point specifying screen" for the photographer to specify a photometric point on the object TG (Step S101). Here, for example, a "photometric point specifying screen" as shown in FIG. 7A is displayed on the display part 310. In the "photometric point specifying screen," a message reading "the object has contrast in brightness" and a message urging the photographer to specify a photometric point are displayed on the display part 310.

Then, the imaging control part 212 displays on the display part 310 a photometric point specifying screen on which multiple selectable photometric points are shown on the finder image. The photographer operates the arrow keys or the like of the operation part 330 to specify a photometric point on the bright part of the object TG (namely, the object $TG^+$).

After a photometric point on the object $TG^+$ is specified (Step S102; Yes), the imaging control part 212 controls the first imaging part 110 and performs what is called a spot photometry in a small range around the specified photometric point (for example, several % of the entire screen area) to determine an exposure condition (Step S103). The exposure condition obtained by spot photometry on the object $TG^+$ is termed "$EV^+$." The imaging control part 212 stores the determined $EV^+$ in the memory.

Figure 7B:
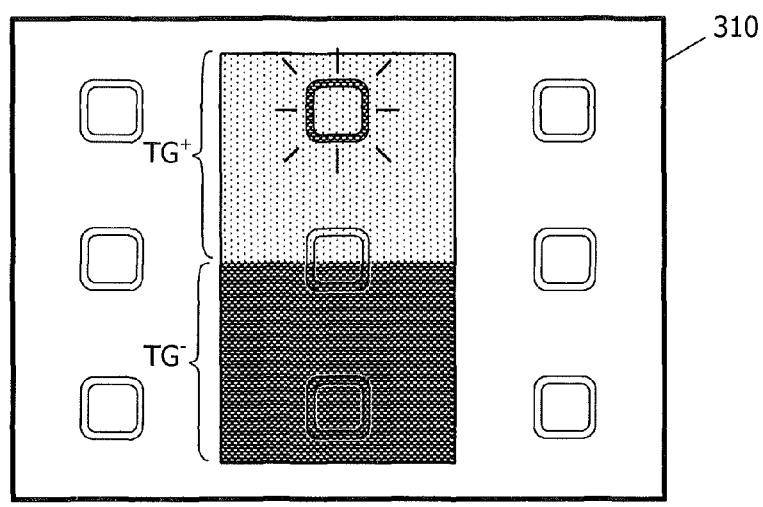

After determining the exposure condition for the object $TG^+$, the imaging control part 212 displays on the display part 310 the photometric point specifying screen as shown in FIG. 7B once again and urges the photographer to specify a photometric point on the dark part of the object TG (namely, the object $TG^-$).

After a photometric point on the object $TG^-$ is specified (Step S104; Yes), the imaging control part 212 determines an exposure condition by spot photometry around the specified photometric point (namely, a photometric point on the object $TG^-$) as it did for the object $TG^+$ (Step S105). The exposure condition obtained by spot photometry on the object $TG^-$ is termed "$EV^-$". The imaging control part 212 stores the determined EV in the memory.

Figure 5:
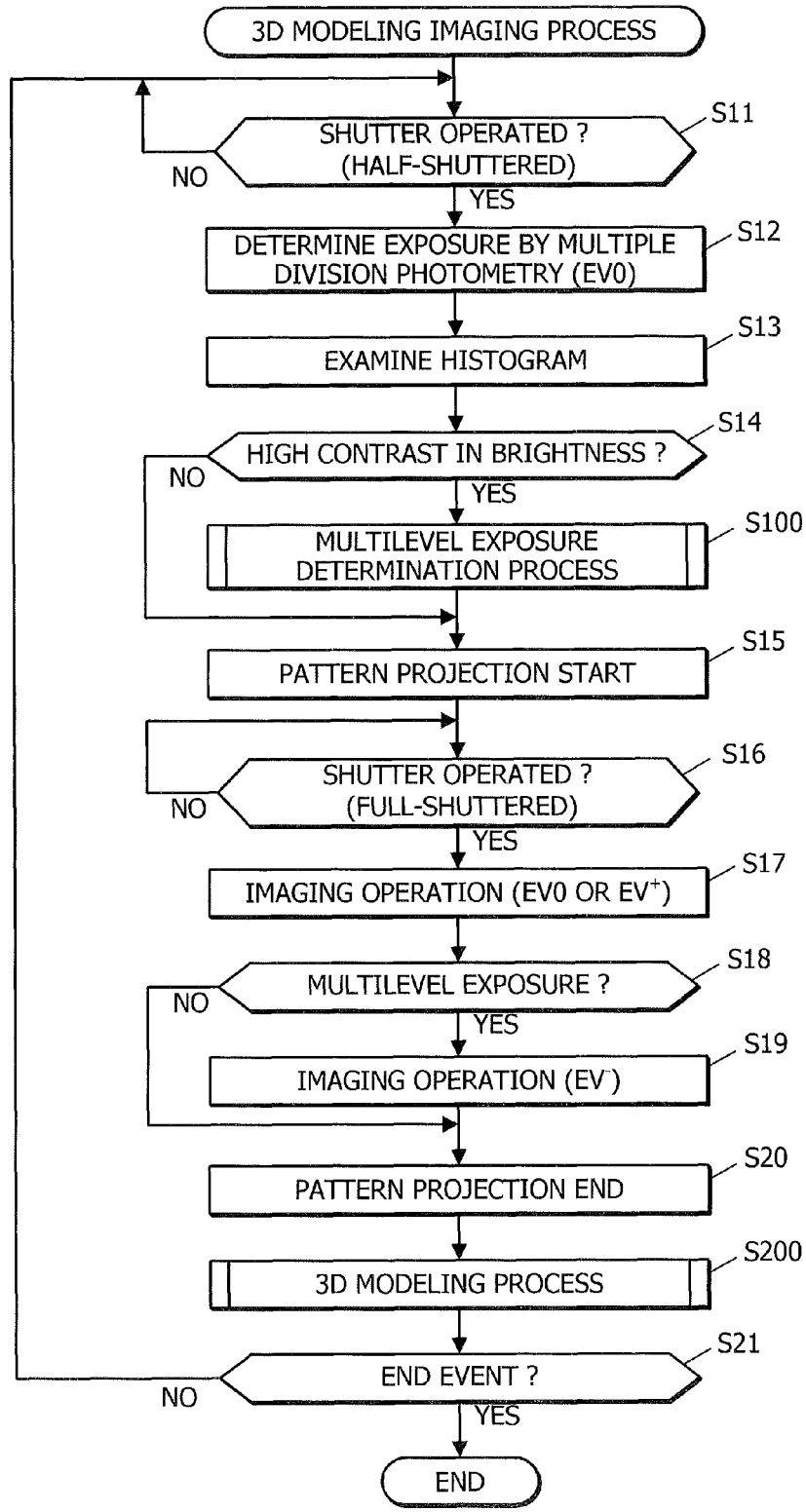
FIG. 5 is a flowchart for explaining the "3D modeling imaging process" according to an embodiment of the present invention.

After obtaining the exposures for the objects $TG^+$ and $TG^-$ of the object TG separately, returning to the flowchart of the "3D modeling imaging process" (FIG. 5).

Here, when the imaging control part 212 determines that the object TG does not have significant contrast in brightness under the exposure condition determined in Step S12 (Step S14, No), the "multilevel exposure determination process" (Step S100) is not executed. In such a case, the exposure condition EV0 determined by multiple division photometry performed in Step S12 is used for the subsequent imaging.

Figure 8A:
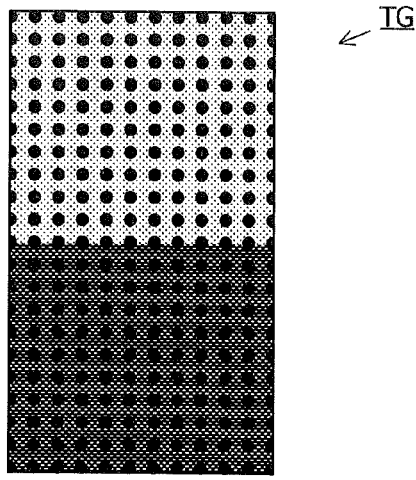
FIG. 8A is an illustration showing an object on which a projection pattern is projected for explaining the imaging operation in the "3D modeling imaging process" shown in FIG. 5.

After the exposure condition (EV0 or $EV^+$ and $EV^-$) is determined as described above, the imaging control part 212 controls the pattern projection part 130 and starts projecting a projection pattern on the object TG (Step S15). More specifically, as shown in FIG. 8A, a projection pattern is projected on the object TG. Here, the projection pattern projected by the pattern projection part 130 is, for example, a dot pattern consisting of small dots regularly arranged. The projection pattern is not restricted to thereto and can be various patterns used in pattern projection methods for 3D modeling (for example, a random pattern).

Figure 6:
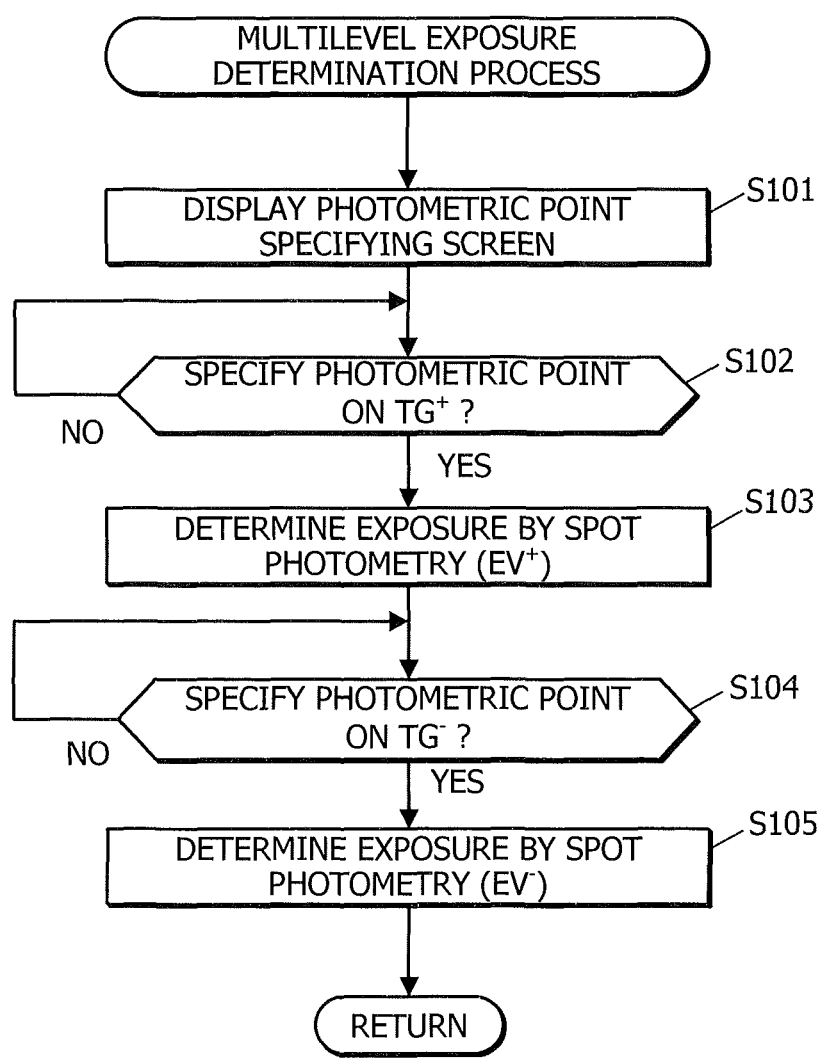
FIG. 6 is a flowchart for explaining the "multilevel exposure determination process" executed in the "3D modeling imaging process" shown in FIG. 5.

When the shutter button is full-shuttered in this state (Step S16: Yes), the imaging control part 212 controls the first and second imaging parts 110 and 120 to capture images under the determined exposure condition (Step S17). Here, when the imaging control part 212 has determined that the object TG has no significant contrast in brightness (multilevel exposure), images are captured with the EV0 determined in Step S12. When the imaging control part 212 has determined that the object TG has significant contrast in brightness, images are captured with the $EV^+$ determined in Step S103 of the "multilevel exposure determination process" (FIG. 6).

Then, in the case of multilevel exposure (Step S18: Yes), the imaging control part 212 further controls the first and second imaging parts 110 and 120 to capture images with the $EV^-$ determined in Step S105 of the "multilevel exposure determination process" (FIG. 6) (Step S19).

In other words, when the object TG has no significant contrast in brightness, one imaging operation using the EV0 as the exposure condition is performed and the imaging control part 212 obtains one image pair IP as shown in FIG. 4B. On the other hand, when the object TG has significant contrast in brightness, two imaging operations using the $EV^+$ and $EV^-$ as the exposure condition are performed and the imaging control part 212 obtains two image pairs IP (image pairs $IP^+$ and $IP^-$) as shown in FIGS. 8B and 8C.

Figure 8B:
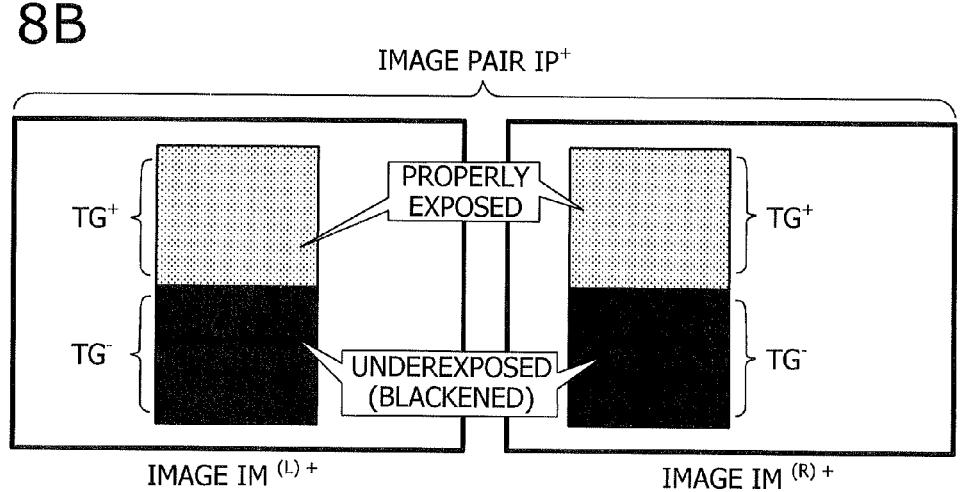
FIG. 8B is an illustration showing a pair of images obtained when the bright part of the object is properly exposed for explaining the imaging operation in the "3D modeling imaging process" shown in FIG. 5.

Here, the image pair IP obtained under the exposure condition $EV^+$ resulting from spot photometry on the object $TG^+$ is termed an image pair $IP^+$ (FIG. 8B). The images $IM^{(L)}$ and $IM^{(R)}$ constituting the image pair $IP^+$ are termed images $IM^{(L)+}$ and $IM^{(R)+}$. Here, the spot photometry was performed on the object $TG^+$ that is the bright part of the object TG and, therefore, the object $TG^+$ is properly exposed (the gradation of the object $TG^+$ appears). In this case, as shown in FIG. 8B, the object $TG^-$ that is the dark part of the object TG is underexposed and even blackened in some cases. In such a case, it is difficult to precisely extract the projection pattern projected on the object $TG^-$ (the projection pattern is not shown in FIG. 8B in order to clarify the difference in exposure condition) from the captured images.

Figure 8C:
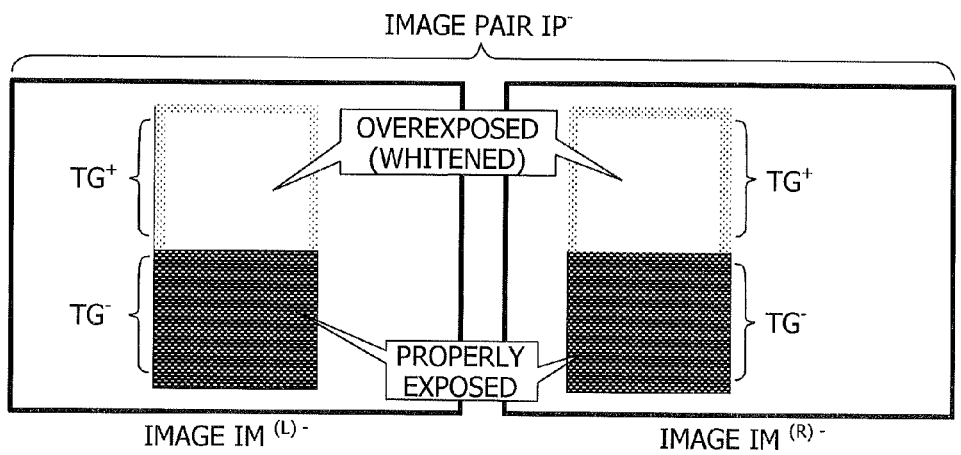
FIG. 8C is an illustration showing a pair of images obtained when the dark part of the object is properly exposed for explaining the imaging operation in the "3D modeling imaging process" shown in FIG. 5.

The image pair IP obtained under the exposure condition $EV^-$ resulting from spot photometry on the object $TG^-$ is termed an image pair $IP^-$ (FIG. 8C). The images $IM^{(L)}$ and $IM^{(R)}$ constituting the image pair $IP^-$ are termed images $IM^{(L)-}$ and $IM^{(R)-}$. Here, the spot photometry was performed on the object $TG^-$ that is the dark part of the object TG and, therefore, the object $TG^-$ is properly exposed (the gradation of the object $TG^-$ appears). In this case, as shown in FIG. 8C, the object $TG^+$ that is the bright part of the object TG is overexposed and even whitened in some cases. In such a case, it is difficult to precisely extract the projection pattern projected on the object $TG^+$ (the projection pattern is not shown in FIG. 8C in order to clarify the difference in exposure condition) from the captured images.

After obtaining the above captured images, the imaging control part 212 stores the obtained image pair IP or image pairs $IP^+$ and $IP^-$ in the image memory, and controls the pattern projection part 130 to end the projection of the projection pattern (Step S20). Then, a "3D modeling process" for performing 3D modeling from the obtained captured images is executed (Step S200). The "3D modeling process" will be described with reference to the flowchart shown in FIG. 9.

In the 3D modeling process of this embodiment, first, the corresponding point extraction part 213 extracts the projection pattern projected on the object TG from the captured images. After the process starts, the corresponding point extraction part 213 obtains target captured images. As described above, since the imaging operation varies depending on the presence/absence of contrast in brightness of the object TG, the corresponding point extraction part 213 determines whether the imaging in the "3D modeling imaging process" (FIG. 5) was of multilevel exposure (Step S201).

When it was of multilevel exposure (Step S201: Yes), as described above, two image pairs $IP^+$ and $IP^-$ have been obtained. Then, the corresponding point extraction part 213 first obtains the image pair $IP^+$ from the image memory 230 (Step S202).

The corresponding point extraction part 213 performs template matching between the images $IM^{(L)+}$ and $IM^{(R)+}$ constituting the obtained image pair $IP^+$ (Step S203). Here, an image pattern (candidate characteristic points) in the image $IM^{(L)+}$ is extracted by a known image recognition technique based on the characteristics (shape, size, array pattern, etc.) of the projection pattern projected by the pattern projection part 130. The corresponding point extraction part 213 uses the image of candidate characteristic points extracted from the image $IM^{(L)+}$ as the template.

Then, the corresponding point extraction part 213 performs template matching, for example, by SSD between the above template and one image $IM^{(R)+}$. As a result, the characteristic points having a degree of match higher than a desired threshold are identified as characteristic points corresponding between image pairs ("corresponding points" hereafter). Here, the corresponding points correspond between the image pairs obtained under the same exposure condition. The corresponding point extraction part 213 identifies a corresponding point pattern consisting of such corresponding points ("corresponding point pattern $PA^+$" hereafter) (Step S204). In other words, the corresponding point pattern is identified between image pairs in which the difference in imaging position corresponding to the parallax is reflected to use in calculation of the distance between the digital camera 1 and the characteristic points.

Figure 10A:
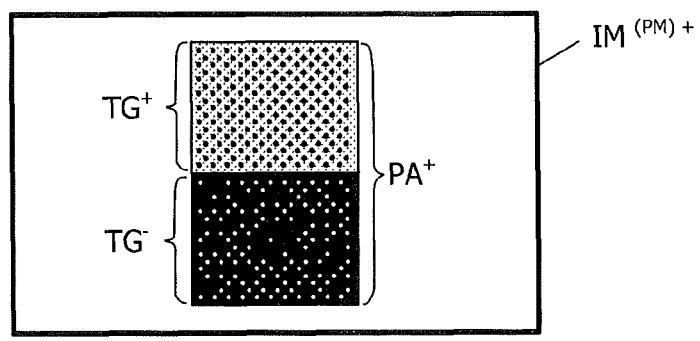
FIGS. 10A and 10B are illustrations showing corresponding point patterns obtained by template matching for explaining the "3D modeling process" shown in FIG. 9.

FIG. 10A shows an image $IM^{(PM)+}$ after template matching between the images $IM^{(L)+}$ and $IM^{(R)+}$ constituting the image pair $IP^+$. Here, as shown in the figure, the corresponding points that match between the images $IM^{(L)+}$ and $IM^{(R)+}$ are obtained. The image pair $IP^+$ is an image pair obtained when the object $TG^+$ is properly exposed. Therefore, the corresponding points on the object $TG^+$ are nearly completely identified. On the other hand, the corresponding points on the underexposed object $TG^-$ are incompletely identified.

Here, for 3D modeling of the entire object TG, almost all corresponding points should be identified on both objects $TG^+$ and $TG^-$. In this embodiment, incomplete corresponding points are complemented in the procedure described later.

Similarly, the corresponding point extraction part 213 performs template matching in the image pair $IP^-$ obtained when the object $TG^-$ is properly exposed and identifies a corresponding point pattern $PA^-$ consisting of nearly complete corresponding points on the object $TG^-$ and incomplete corresponding points on the object $TG^+$.

In other words, the corresponding point extraction part 213 obtains the image pair $IP^-$ from the image memory 230 (Step S205) and performs template matching using the image pattern extracted from the image $IM^{(L)-}$ as the template (Step S206), whereby the characteristic points having a degree of match higher than a desired threshold are identified as a corresponding point pattern $PA^-$ consisting of corresponding points between image pairs obtained under the same exposure condition (Step S207).

Here, when the imaging was not of multilevel exposure (Step S201: No), the corresponding point extraction part 213 obtains the image pair IP captured with EV0 from the image memory 230 (Step S208) and performs template matching between the images $IM^{(L)}$ and $IM^{(R)}$ constituting the obtained image pair IP (Step S209). The corresponding point extraction part 213 identifies candidate characteristic points having a degree of match higher than a desired threshold as a corresponding point pattern PA consisting of characteristic points (corresponding points) corresponding between image pairs obtained under the same exposure condition (Step S210). In this case, the object TG has no significant contrast in brightness and, therefore, an image pattern can be obtained from the projection pattern projected on the object TG in either one of the images $IM^{(L)}$ and $IM^{(R)}$ captured with EV0.

Figure 11:
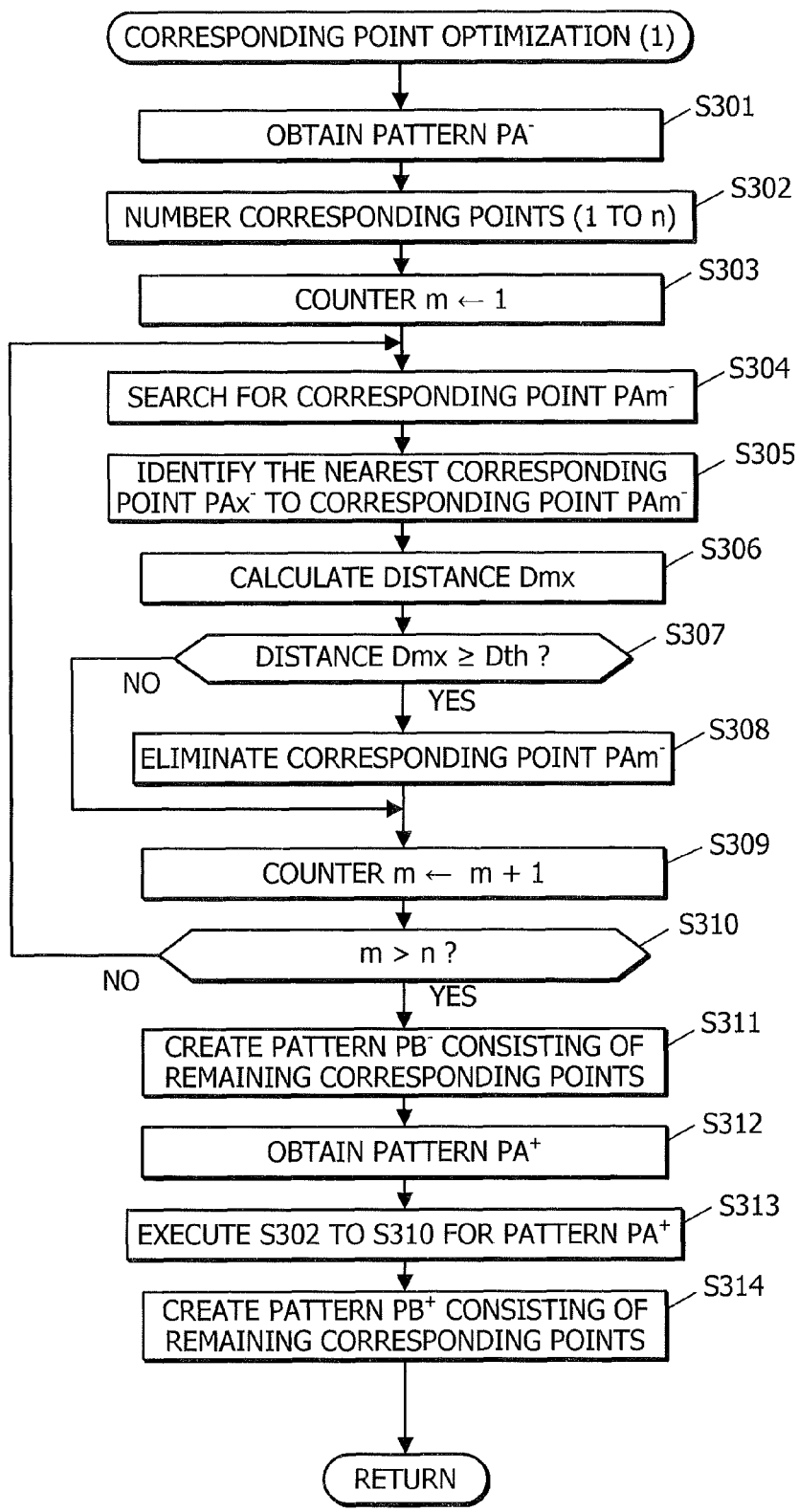
FIG. 11 is a flowchart for explaining the "corresponding point optimization process (1)" executed in the "3D modeling process" shown in FIG. 9.

As described above, the corresponding point extraction part 213 extracts the corresponding points by template matching between the images constituting an image pair and stores the template matching results in the image memory 230. Then, the corresponding point optimization part 214 performs a "corresponding point optimization process (1)" for optimizing the extracted corresponding points (Step S300). Here, the term "optimization" means extracting a better part of a corresponding point pattern in order to complement the corresponding point pattern that is incomplete on the overexposed or underexposed object $TG^+$ or $TG^-$. The "corresponding point optimization process (1)" will be described with reference to the flowchart shown in FIG. 11.

Figure 10B:
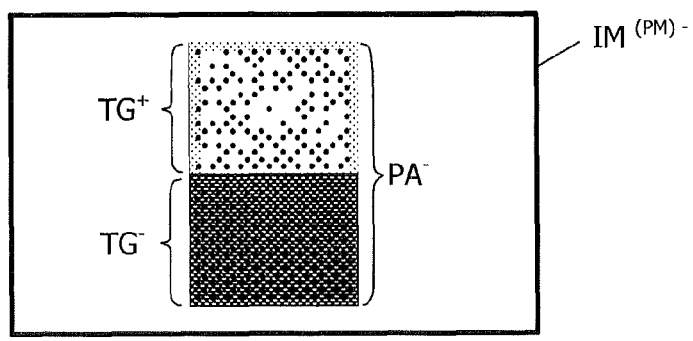

After the process starts, the corresponding point optimization part 214 obtains the corresponding point pattern $PA^-$ as exemplified in FIG. 10B from the image memory 230 (Step S301). Here, the corresponding point pattern $PA^-$ contains corresponding points $PA^-$ to $PAn^-$ (namely, n corresponding points). The corresponding point optimization part 214 numbers the corresponding points $PM^-$ to $PAn^-$ from 1 to n (Step S302).

After numbering the corresponding points of the corresponding point pattern $PA^-$, the corresponding point optimization part 214 sets a counter m for specifying a corresponding point constituting the corresponding point pattern $PA^-$ to an initial value 1 (Step S303) and searches the corresponding point pattern $PA^-$ for a corresponding point $PAm^-$, the m-th corresponding point (Step S304).

Figure 12A:
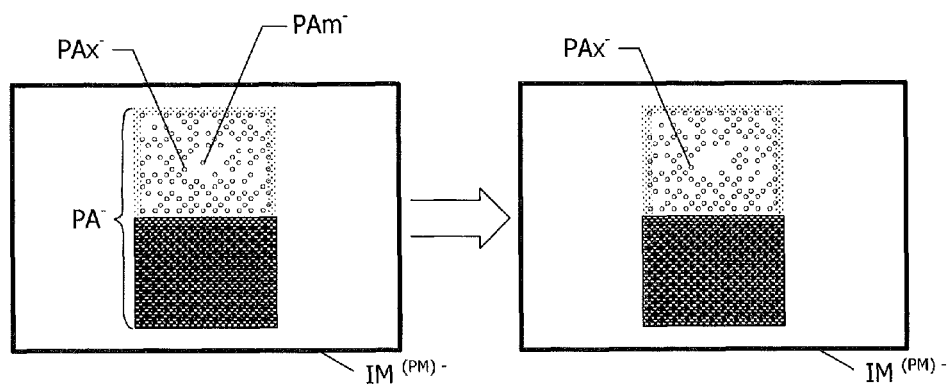
FIGS. 12A and 12B show optimization based on the distance between dots on the image and FIGS. 12C and 12D show optimized corresponding points.

After finding the corresponding point $PAm^-$, the corresponding point optimization part 214 identifies, for example, the nearest point $PAx^-$ that is the nearest to the corresponding point $PAm^-$ in the corresponding point pattern $PA^-$ as shown in FIG. 12A (Step S305). Then, the corresponding point optimization part 214 calculates the distance between the corresponding point $PAm^-$ and nearest point $PAx^-$ (the distance Dmx) (Step S306).

Figure 12B:
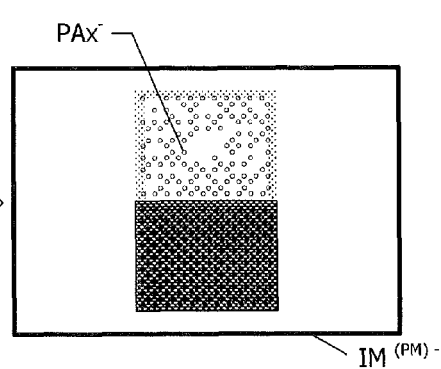

The corresponding point optimization part 214 compares the calculated distance Dmx with a threshold Dth. When the distance Dmx between the corresponding point $PAm^-$ and nearest point $PAx^-$ is equal to or larger than the threshold Dth (Step S307: Yes), the corresponding point optimization part 214, for example, eliminates the corresponding point $PAm^-$ from the corresponding point pattern $PA^-$ as shown in FIG. 12B (Step S308).

On the other hand, when the distance Dmx is smaller than the threshold Dth (Step S307: No), the corresponding point $PAm^-$ stays in the corresponding point pattern $PA^-$.

Figure 12C:
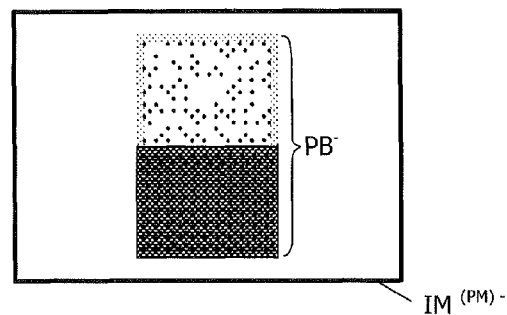

Then, the corresponding point optimization part 214 increases the counter m by +1 (Step S309) and, if the value is lower than n, the number of corresponding points (Step S310: No), the procedures in Step S304 and subsequent steps are repeated for the subsequent corresponding point. After the corresponding point optimization part 214 performs the above procedures for all corresponding points in the corresponding point pattern $PA^-$ (Step S310: Yes), as shown in FIG. 12C, the corresponding points that are not eliminated in Step S308 remain. The corresponding point optimization part 214 stores a corresponding point pattern consisting of such corresponding points in the image memory 230 as a corresponding point pattern $PB^-$ (Step S311).

In other words, the dot pattern of the corresponding point pattern $PA^-$ obtained by template matching between the images constituting the image pair $IP^-$ is optimized based on the distance between dots on the image to create an optimized corresponding point pattern $PB^-$.

Figure 12D:
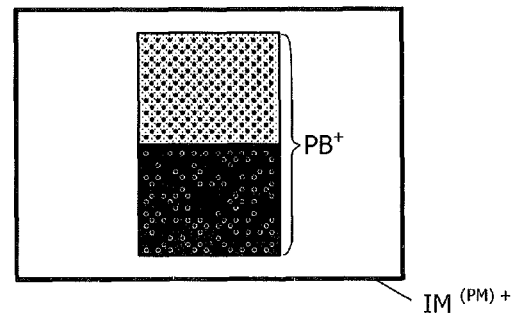

Then, the corresponding point optimization part 214 obtains the corresponding point pattern $PA^+$ from the image memory 230 (Step S312) and performs the same procedures as those in Steps S302 to S310 for the obtained corresponding point pattern $PA^+$ (Step S313). Consequently, the corresponding point optimization part 214 optimizes the corresponding point pattern $PA^+$ based on the distance between dots on the image to obtain a corresponding point pattern PB$^+$ (FIG. 12D) (Step S314). The corresponding point pattern PB$^+$ obtained as described is also stored in the image memory 230.

As described above, the image pattern on the captured image is optimized in each of captured images captured under different exposure conditions based on the distance between dots of the dot pattern on the image. In other words, for optimization, sparsely distributed corresponding points are eliminated and only the corresponding points in higher density regions are kept in a pair of images captured under the same exposure condition.

Incidentally, when the object TG has no contrast in brightness and its images are captured with EV0, the same procedures as those in Steps S302 to S310 are performed. Consequently, the corresponding point pattern PA obtained by template matching between the images of the image pair IP can be optimized based on the distance between dots on the image.

In other words, whether or not the target captured images are captured with multilevel exposure, the corresponding points are optimized in the "corresponding point optimization process (1)." Incidentally, the numbers of corresponding points contained in the initially obtained corresponding point patterns PA, PA$^+$, and PA$^-$ are all referred to by n for convenience, which does not means they are the same number.

Figure 9:
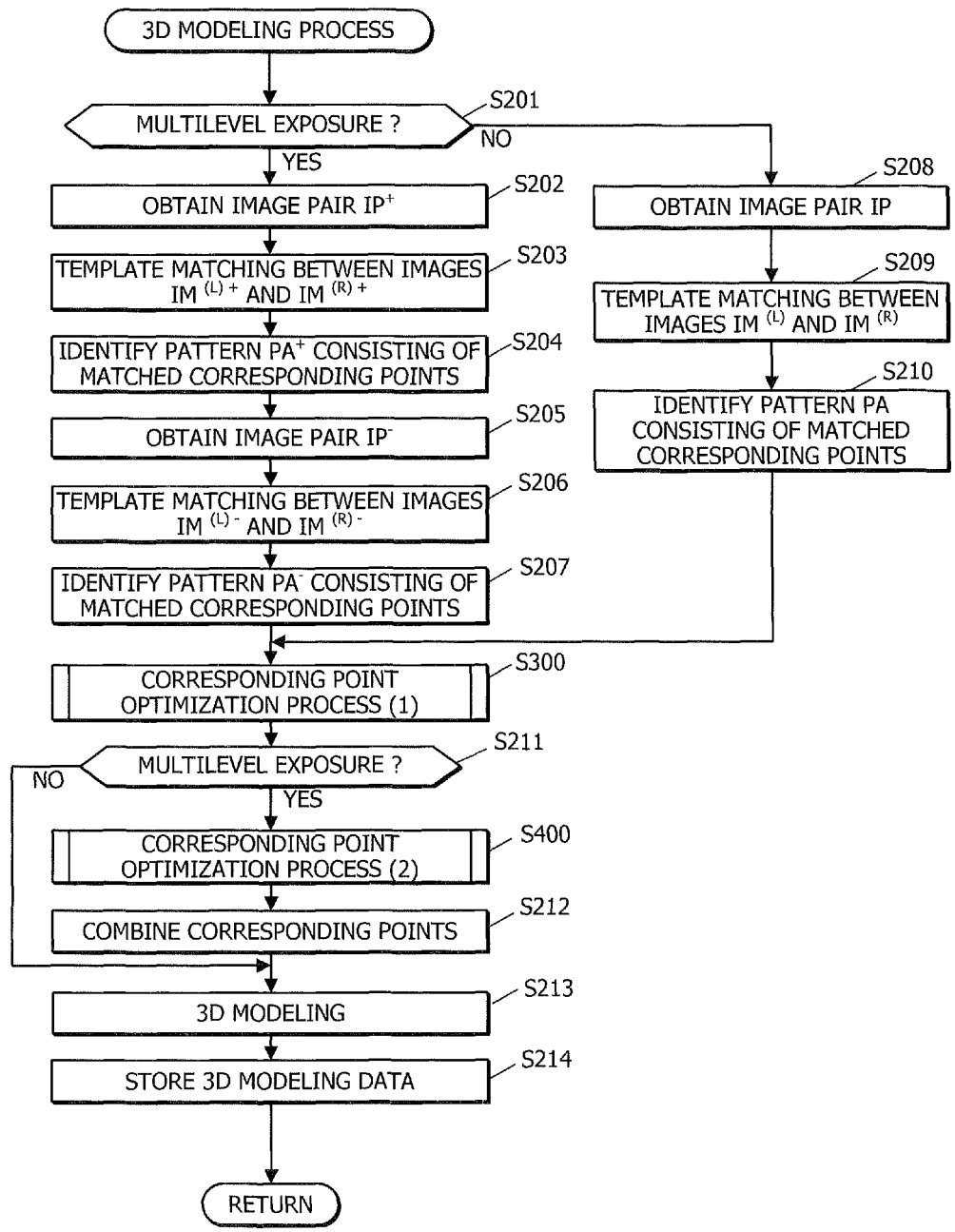
FIG. 9 is a flowchart for explaining the "3D modeling process" executed in the "3D modeling imaging process" shown in FIG. 5.
Figure 13:
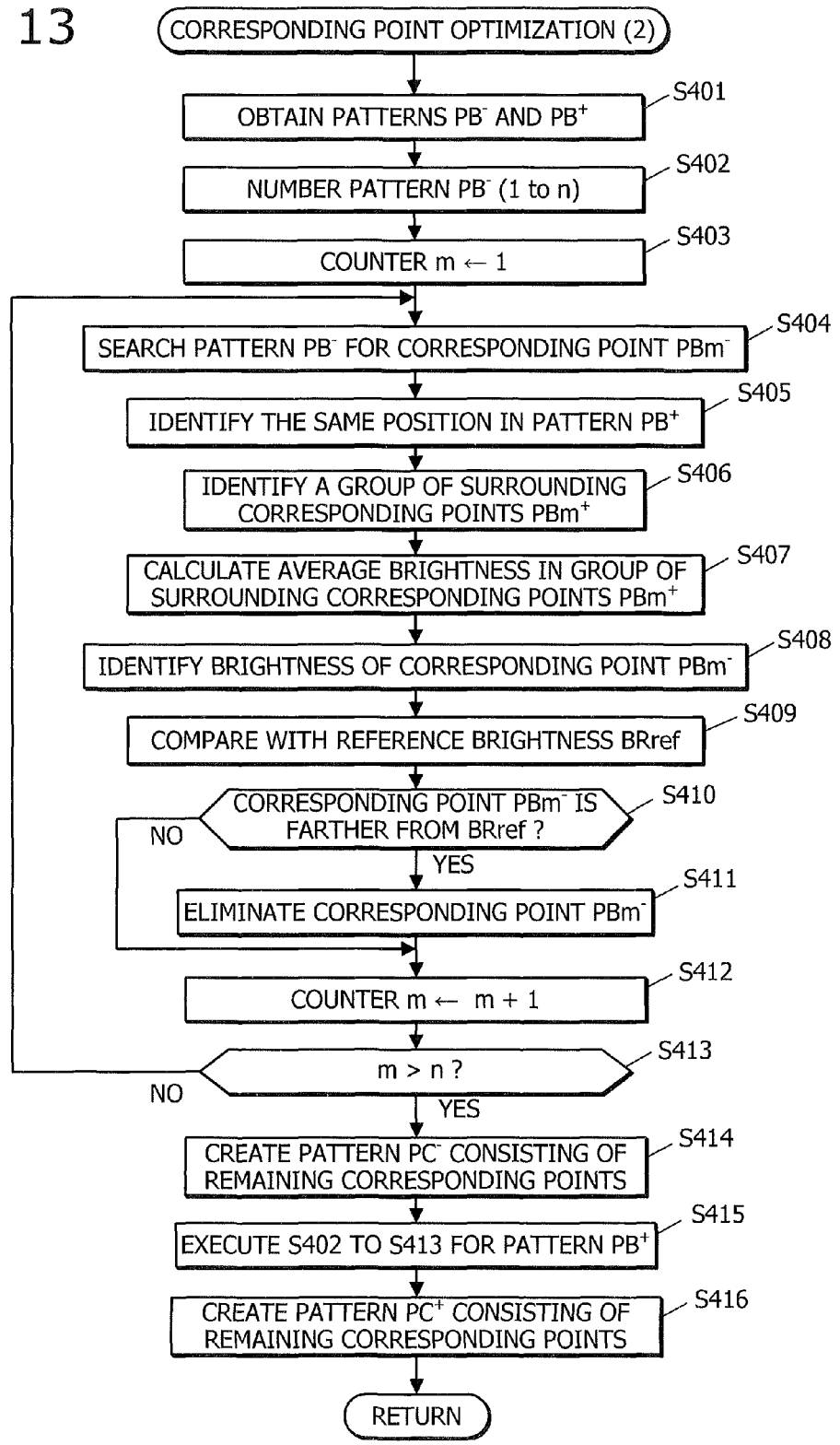
FIG. 13 is a flowchart for explaining the "corresponding point optimization process (2)" executed in the "3D modeling process" shown in FIG. 9.

After the "corresponding point optimization process (1)" ends, returning to the flowchart of the "3D modeling process" (FIG. 9). In the "3D modeling process," when the imaging was of multilevel exposure (Step S211: Yes), the corresponding point optimization part 214 performs a "corresponding point optimization process (2)" for further optimization (Step S400). The "corresponding point optimization process (2)" will be described with reference to the flowchart shown in FIG. 13.

The corresponding point optimization part 214 obtains the corresponding point patterns PB$^-$ and PB$^+$ obtained in the "corresponding point optimization process (1)" (FIG. 11) from the image memory 230 (Step S401). Here, it is assumed that the corresponding point pattern PB$^-$ contains corresponding points PB1$^-$ to PBn$^-$ (namely, n corresponding points). The corresponding point optimization part 214 numbers the corresponding points PB1$^-$ to PBn$^-$ from 1 to n (Step S402). In this embodiment, the number of corresponding points is n for convenience, which does not means they are the same number.

Figure 14A:
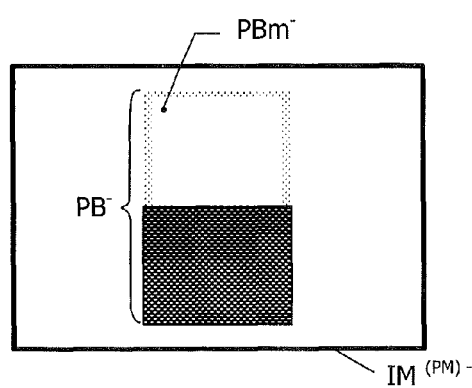
FIGS. 14A and 14B are illustrations showing optimization based on the brightness between images captured with different exposures for explaining the "corresponding point optimization process (2)" shown in FIG. 13.

After numbering the corresponding points of the corresponding point pattern PB$^-$, the corresponding point optimization part 214 sets a counter m for specifying a corresponding point constituting the corresponding point pattern PB$^-$ to an initial value 1 (Step S403). The corresponding point optimization part 214 searches the corresponding point pattern PB$^-$, for example, for a corresponding point PBm$^-$, the m-th corresponding point as shown in FIG. 14A (Step S404).

Figure 14B:
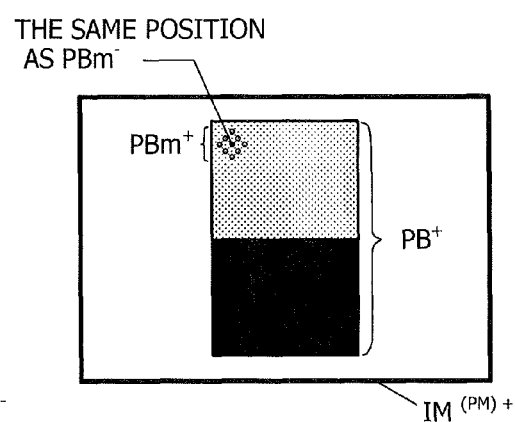

Then, the corresponding point optimization part 214 indentifies in the corresponding point pattern PB$^+$, for example, the same coordinate position (position on a two-dimensional plane) as the corresponding point PBm$^-$ in the corresponding point pattern PB$^-$ as shown in FIG. 14B (Step S405). The corresponding point optimization part 214 identifies a corresponding point group PBm$^+$ consisting of multiple corresponding points within a given distance from that position (FIG. 14B) (Step S406).

After identifying the corresponding point group PBm$^+$ in the corresponding point pattern PB$^+$, the corresponding point optimization part 214 calculates the average brightness of the corresponding point group PBm$^+$ (Step S407) and identifies the brightness of the corresponding point PBm$^-$ in the corresponding point pattern PB$^-$ that was searched for in Step S404 (Step S408).

The corresponding point optimization part 214 compares the calculated average brightness of the corresponding point group PBm$^+$ and the brightness of the corresponding point PBm$^-$ with reference brightness BRref, respectively (Step S409). The reference brightness BRref is, for example, the median of gradation in brightness (for example, the reference brightness BRref is "127" when the brightness is expressed by 8 bits).

As a result of comparison, when the brightness of the corresponding point PBm$^-$ is farther from the reference brightness BRref than the average brightness of the corresponding point group PBm$^+$ (Step S410: Yes), the corresponding point optimization part 214 eliminates the corresponding point PBm$^-$ from the corresponding point pattern PB$^-$ (Step S411). On the other hand, when the average brightness of the corresponding point group PBm$^+$ is farther from the reference brightness BRref (Step S410: No), the corresponding point PBm$^-$ stays in the corresponding point pattern PB$^-$. In other words, if the brightness of the corresponding point PBm$^-$ is extremely high or low, it is difficult to identify it; therefore, such a corresponding point is eliminated.

Figure 14C:
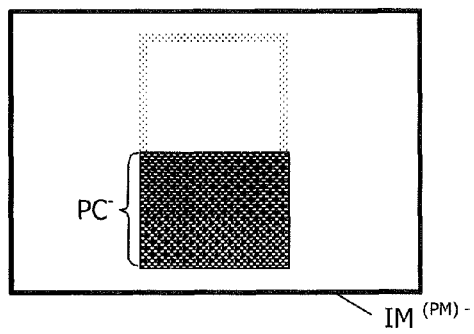
FIGS. 14C and 14D are illustrations showing optimized corresponding points for explaining the "corresponding point optimization process (2)" shown in FIG. 13.

After the above procedures are done with the corresponding point PBm$^-$, the corresponding point optimization part 214 increases the counter m by +1 (Step S412) and, if the value is not greater than n, the number of corresponding points (Step S413, No), the procedures in Step 404 and subsequent steps are preformed for the subsequent corresponding point. After such procedures are performed for all corresponding points in the corresponding point pattern PB$^-$ (Step S413: Yes), as shown in FIG. 14C, the corresponding points that are not eliminated in Step S411 remain. The corresponding point optimization part 214 stores a corresponding point pattern consisting of such corresponding points in the memory 230 as a corresponding point pattern PC$^-$ (Step S414).

As described above, in the corresponding point patterns PB$^-$ and PB$^+$ obtained in Step S401, the corresponding point optimization part 214 compares the brightness between the corresponding point PBm$^-$ in the corresponding point pattern PB$^-$ and the corresponding point group PBm$^+$ in the corresponding point pattern PB$^+$ that is at the same position as the corresponding point PBm$^-$ for optimizing the corresponding points.

Figure 14D:
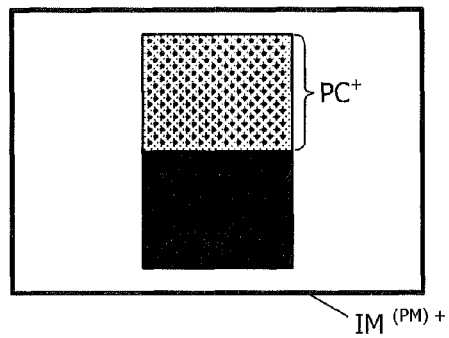

Then, the corresponding point optimization part 214 performs the same procedures as those in Step S402 to S413 for the corresponding point pattern PB$^+$ (Step S415) to obtain a corresponding point pattern PC$^+$ as shown in FIG. 14D (Step S416). In other words, the corresponding point optimization part 214 searches the corresponding point pattern PB$^+$ for a corresponding point (a corresponding point PBm$^+$) in sequence and identifies a corresponding point group PBm$^-$ in the corresponding point pattern PB$^-$ that is at the same coordinate position. Then, the corresponding point optimization part 214 compares the average brightness of the corresponding point group PBm$^-$ and the brightness of the corresponding point PBm$^+$ with the reference brightness BRref, respectively. If the brightness of the corresponding point PBm$^+$ is farther from the reference brightness BRref, the corresponding point PBm$^+$ is eliminated from the corresponding point pattern PB$^+$.

In this way, a corresponding point pattern part having an appropriate brightness remains. In other words, a corresponding point pattern appearing with a more recognizable brightness (pixel value) is selected for optimization. After the corresponding point optimization part 214 obtains the corresponding point patterns PC⁻ (FIG. 14C) and PC⁺ (FIG. 14D) optimized based on the brightness, returning to the flowchart of the "3D modeling process" (FIG. 9).

Figure 10C:
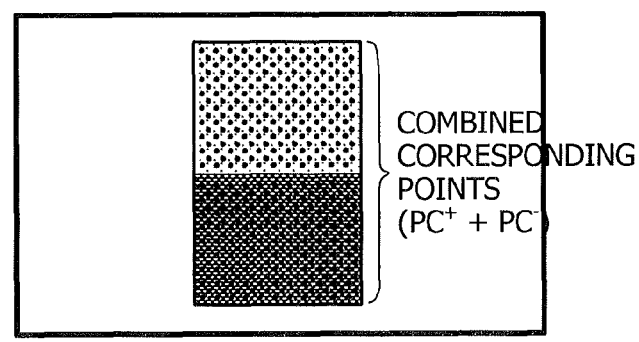
FIG. 10C is an illustration showing combined corresponding points obtained by combining optimized corresponding points for explaining the "3D modeling process" shown in FIG. 9.

Here, when the "corresponding point optimization process (2)" is performed because of multilevel exposure imaging, the corresponding point optimization part 214 combines the corresponding points constituting the obtained corresponding point patterns PC⁻ (FIG. 14C) and PC⁺ (FIG. 14D) to create a corresponding point pattern consisting of combined corresponding points as shown in FIG. 10C (Step S212). In other words, the image pairs are captured at the same camera position. The corresponding points can simply be combined between the image pairs captured under different exposure conditions to create combined corresponding points.

In this case, the 3D modeling part 215 performs 3D modeling using the combined corresponding points (Step S213).

On the other hand, when the imaging was not of multilevel exposure (Step S211: No), the 3D modeling part 215 performs 3D modeling using the corresponding points obtained by the corresponding point optimization part 214 in the "corresponding point optimization process (1)" (Step S300) on the corresponding point pattern PA identified in Step S210 (Step S213).

The 3D modeling part 215 performs 3D modeling based on corresponding points in accordance with the principles of triangulation. Here, it is assumed that there is a corresponding point A1 and the A1 locates at a three-dimensional position (X1, Y1, Z1) on the camera coordinates. In this case, in the digital camera 1 having a parallel stereo structure as shown in FIG. 1B, the coordinates (X1, Y1, Z1) of A1 are expressed by the following formulae Math 1 to Math 3. Here, (u1, v1) is a projection point to the corresponding point A1 by the first imaging part 110 and (u'1, v'1) is a projection point to the corresponding point A1 by the second imaging part 120. Furthermore, b is the distance between the optical axes of the first and second imaging parts 110 and 120.

$$X1 = (b \cdot (u1))/((u'1) - u1) \quad \text{(Math 1)}$$

$$Y1 = (b \cdot (v1))/((u'1) - u1) \quad \text{(Math 2)}$$

$$Z1 = (b \cdot f)/((u'1) - u1) \quad \text{(Math 3)}$$

Here, the distance between the digital camera 1 and the point A1 is given by the coordinate Z1 of the point A1. The corresponding point optimization part 214 can calculate the imaging distance to the corresponding point A1 on the object TG by calculating the above Math 3.

The Math 3 is derived in accordance with the principles of triangulation. The principles of triangulation will be described with reference to FIG. 15.

Figure 15:
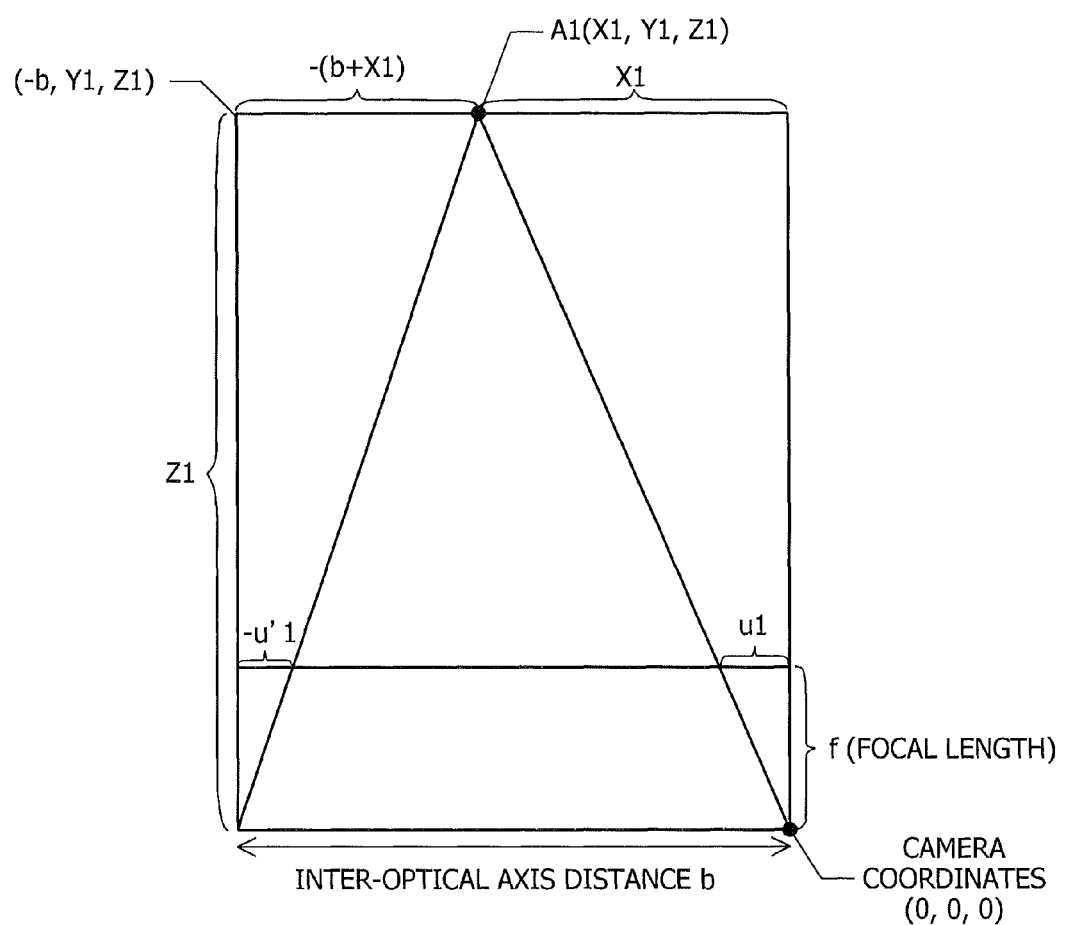
FIG. 15 is an illustration for explaining the principles of triangulation.

FIG. 15 is a schematic illustration of the camera coordinates seen from above of the parallel stereo structure shown in FIG. 1B. The camera coordinates are based on the viewing point of the first imaging part 110. The coordinate of the object position A1 in the X axis direction is given by X1 on the camera coordinates and the value is obtained by the following formula (1).

On the other hand, the coordinate of the point A1 in the X axis direction from the viewpoint of the second imaging part 120 is given by the sum of the inter-optical axis distance b and the camera coordinate X1 and obtained by the following formula (2). The following Math 3 is derived from these formulae (1) and (2).

$$X1 = ((u1) \cdot Z1)/f \quad \text{formula (1)}$$

$$Y1 = ((u'1) \cdot Z1)/f \quad \text{formula (2)}$$

$$Z1 = (b \cdot f)/((u'1) - u1) \quad \text{Math 3}$$

The 3D modeling part 215 calculates the imaging distance to each corresponding point using the above principles of triangulation to create 3D modeling data on the object TG.

The 3D modeling part 215 stores the 3D modeling data created as described above in the memory 250 or external memory 260 (Step S214), returning to the flowchart of the "3D modeling imaging process" (FIG. 5).

In the "3D modeling imaging process", the procedures in Step S11 and subsequent steps are performed unless, for example, a given end event, such as cancel of the 3D modeling mode and power-off of the digital camera 1, occurs (Step S21: No). In other words, further imaging operation is performed and images captured in such an operation are used for creating 3D modeling data. Then, when an end event occurs, the process ends (Step S21: Yes).

As described above, highly accurate 3D modeling data presenting an object of which images are captured by a digital camera can easily be obtained by applying the present invention as in the above embodiment.

One or multiple exposure conditions are set up for an object, whereby multiple images can be captured with the bright and dark parts of the object being proper exposed. Even if the object has contrast in brightness, the projection pattern projected on the object is precisely obtained to create highly accurate 3D modeling data.

In this case, the imaging device comprises a structure for projecting a projection pattern on the object, whereby a single imaging device can be used for seamless operation from imaging to creation of 3D modeling data; highly accurate 3D modeling data can easily be created.

Furthermore, the corresponding points are optimized based on the density of corresponding points from the image pattern recognizable in the captured image, whereby, for example, a part containing corresponding points at a high density can be extracted. In this way, pattern recognition accuracy necessary for creating 3D modeling data can be improved.

Furthermore, the corresponding points are optimized based on the brightness of corresponding points. For example, a part where the corresponding points have high brightness can be extracted. In this way, pattern recognition accuracy necessary for creating 3D modeling data can be improved.

In this case, the extracted corresponding points are combined for creating 3D modeling data, whereby highly accurate pattern recognition can be achieved over the entire object. Therefore, even if the object has contrast in brightness, highly accurate 3D modeling data can be created.

Furthermore, it is possible to examine the contrast in brightness of the object during imaging and, for example, when the object has significant contrast in brightness, set up multiple exposure conditions. In this way, a series of operations from imaging to creation of 3D modeling data can more effectively be performed.

The above embodiment is given by way of example. The present invention is not confined thereto. In other words, various applications are available and any form of implementation falls under the scope of the present invention.

For example, in the above embodiment, a projection pattern is projected on an object. Any method can be used for extracting corresponding points. For example, the edges of an object image on a captured image can be detected to extract corresponding points. Alternatively, when the object has some texture, corresponding points can be extracted based on the texture.

Furthermore, in the above embodiment, when the object has contrast in brightness, the photographer specifies the bright and dark part of the object. For example, exposure conditions can automatically be obtained by increasing/decreasing the exposure condition EV0 determined by multiple division photometry stepwise a given number of times. In such a case, for example, the AEB (automatic exposure bracket) function common to ordinary digital cameras can be used.

Furthermore, in the above embodiment, the imaging control part performs imaging under different exposure conditions when the object has contrast in brightness. The exposure condition can include the direction and/or intensity of light from the light source and the projection pattern to be projected on an object. In such a case, the imaging control part changes the direction and/or intensity of light before imaging when the object has contrast in brightness. Alternatively, the pattern to be projected on an object is changed before imaging.

Furthermore, in the "corresponding point optimization process (1)" of the above embodiment, the corresponding points are optimized based on the distance between a corresponding point and the nearest corresponding point thereto. The method is not restrictive and any method can be utilized as long as the corresponding points are optimized based on the density of corresponding points. For example, the corresponding points can be optimized by finding the density based on the number of corresponding points within a given range around a corresponding point.

Furthermore, in the "corresponding point optimization process (2)" of the above embodiment, the corresponding points are optimized by comparison of the brightness. The method is not restrictive and any method can be utilized as long as the corresponding points are optimized based on the pixel values of corresponding points. For example, the corresponding points can be optimized by comparing the green value, which is one of the pixel values of corresponding points.

Furthermore, in the above embodiment, the corresponding points are obtained on a two-dimensional image to create 3D modeling data. The corresponding points can be identified by estimating their three-dimensional positions and the three-dimensional corresponding points can be optimized or combined.

In the above embodiment, the present invention is realized by a compound eye camera (stereo camera) having two imaging parts at different imaging positions in an imaging device. The present invention can be realized by a monocular camera having one imaging part. In such a case, multiple imaging operations are performed with the imaging part being shifted. A structure for mechanically shifting the imaging part can be provided to shift the optical axis in accordance with the parallax.

Furthermore, in the above embodiment, two imaging parts constitute a parallel stereo structure. They can have any positional relationship. In such a case, the positional relationship between two imaging parts (an external parameter) is measured in advance and the external parameter is used to convert captured images to parallel-shifted images. In such a case, as in the case of using a compound eye camera having a parallel stereo structure, search is made in one direction, the direction X or the direction Y, to obtain the correspondence between any points in the parallel-shifted images.

Furthermore, in the above embodiment, the imaging device has a structure for projecting a projection pattern on an object. The imaging device does not have to have a structure for projecting a projection pattern on an object as long as a projection pattern can be projected on an object upon imaging.

The present invention can be realized by an imaging device in which the same functions or components as those of the imaging device of the above embodiment are preinstalled or by applying programs to an existing imaging device (such as a digital camera) to make it work as the imaging device of the present invention as long as captured images corresponding to the parallax can be obtained. In such a case, the computer (the control part such as a CPU) of the imaging device having the same structure as the digital camera 1 exemplified in the above embodiment executes programs for realizing the same functions as those of the above-described control part 210, thereby making it work as the imaging device of the present invention.

In the above embodiment, the imaging device is a digital still camera by way of example. Any imaging device can be used as long as it has the same structure as the digital camera 1 exemplified in the above embodiment. For example, a digital video camera can be used to realize the imaging device of the present invention.

In any case, programs can be applied to make an existing device work as the image display device of the present invention. Such programs can be applied by any means, for example, by storing in a recording medium such as a CD-ROM and memory card or via a communication medium such as the Internet.

The present invention can easily create highly accurate 3D modeling data.

What is claimed is:
1. An imaging device comprising:
a projecting part which projects a pattern on an object;
an imaging part which acquires two captured images of the object having the pattern projected thereon, wherein the two captured images have optical axes at different positions and are two-dimensional images;
a setting part which sets exposure conditions for the imaging part to capture images of the object;
a controlling part which controls the imaging part and performs imaging operations as many times as the number of the exposure conditions set by the setting part;
an extracting part which extracts corresponding points that are characteristic points corresponding between the two captured images obtained under the control of the controlling part, the corresponding points appearing in the pattern projected on the object in the captured images;
an optimizing part which performs a corresponding point optimization process on the corresponding points to select corresponding points which are included in the captured images and which meet predetermined conditions from among the corresponding points which are (i) captured for each of the exposure conditions and (ii) extracted by the extracting part;
a combining part which combines the corresponding points which are (i) captured for each of the exposure conditions and (ii) selected by the optimizing part such that each of the corresponding points having a same optical axis are superimposed;
a calculating part which calculates coordinate values in three dimensional coordinates for a position on the object that corresponds to the corresponding points using a pair of the corresponding points that are superimposed by the combining part; and
a creating part which creates 3D modeling data that defines a shape of the object based on the coordinate values in the three dimensional coordinates that are calculated by the calculating part.
2. The imaging device according to claim 1, wherein the setting part sets at least (i) an exposure condition under which a bright part of the object is properly exposed and (ii) an exposure condition under which a dark part of the object is properly exposed.

3. The imaging device according to claim 1, wherein the optimizing part selects the corresponding points which (i) are extracted by the extracting part and (ii) have a density meeting a given condition.

4. The imaging device according to claim 1, wherein the optimizing part selects the corresponding points which (i) are extracted by the extracting part and (ii) have a pixel value meeting a given condition.

5. The imaging device according to claim 1, further comprising a determining part which determines whether the object has contrast in brightness, wherein the setting part sets an exposure condition according to the determination result of the determining part.

6. The imaging device according to claim 1, wherein the corresponding point optimization process eliminates one of the corresponding points when a distance between the one of the corresponding points and a nearest corresponding point is equal to or larger than a threshold.

7. The imaging device according to claim 1, wherein the corresponding point optimization process eliminates one of the corresponding points when a value of a difference between a brightness of the one of the corresponding points and a threshold value is further from a value of a difference between an average brightness of a group of the corresponding points having different exposure conditions and the threshold value.

8. A method for creating 3D modeling data of an object with an imaging device comprising a projecting part which projects a pattern on the object, and an imaging part that obtains a pair of two-dimensional images of the object having the pattern projected thereon, the pair of two-dimensional images having optical axes at different positions, and the method comprising:
 a first imaging step of obtaining a first pair of two-dimensional images in an imaging operation of the imaging part in which a bright part of the object is properly exposed;
 a second imaging step of obtaining a second pair of two-dimensional images in an imaging operation of the imaging part in which a dark part of the object is properly exposed;
 an extracting step of extracting corresponding points that are corresponding characteristic points in each of the first and the second pairs of images, the extracted corresponding points appearing in the pattern projected on the object in the first and second pairs of images;
 a first optimizing step of selecting corresponding points which (i) are extracted in the extracting step and (ii) have a density meeting a first given condition in each of the first and the second pairs of images;
 a second optimizing step of selecting corresponding points which (i) are extracted in the extracting step and (ii) have a pixel value meeting a second given condition between the first and the second pairs of images;
 a combining step of combining the corresponding points selected in the first optimizing step and in the second optimizing step, such that each of the corresponding points having a same optical axis are superimposed;
 a calculating step of calculating coordinate values in three dimensional coordinates for a position on the object that corresponds to the corresponding points using a pair of the corresponding points for each of the optical axes that are superimposed in the combining step; and
 a creating step of creating 3D modeling data that defines a shape of the object based on the coordinate values in the three dimensional coordinates that are calculated in the calculating step.

9. A non-transitory computer-readable storage medium having stored thereon a program executable by a computer of an imaging device, the imaging device comprising a projection part which projects a pattern on an object and an imaging part that acquires two captured images of the object having the pattern projected thereon, wherein the two captured images have optical axes at different positions and are two-dimensional images, and wherein the program controls the computer to perform functions comprising:
 setting exposure conditions for the imaging part to capture images of the object;
 controlling the imaging part and performing imaging operations as many times as the number of the set up exposure conditions;
 extracting corresponding points that are characteristic points corresponding between the two captured images obtained in the imaging operation, the corresponding points appearing in the pattern projected on the object in the captured images;
 performing a corresponding point optimization process on the corresponding points to select corresponding points which are included in the captured images and which meet predetermined conditions from among the corresponding points which are (i) captured for each of the exposure conditions and (ii) extracted in the extracting;
 combining the corresponding points which are (i) captured for each of the exposure conditions and (ii) selected by the selecting, such that each of the corresponding points having a same optical axis are superimposed;
 calculating coordinate values in three dimensional coordinates for a position on the object that corresponds to the corresponding points using a pair of the corresponding points that are superimposed; and
 creating 3D modeling data that defines a shape of the object based on the coordinate values in the three dimensional coordinates.

* * * * *